US009748829B2

(12) United States Patent
Azuma et al.

(10) Patent No.: US 9,748,829 B2
(45) Date of Patent: Aug. 29, 2017

(54) POWER MODULE

(71) Applicant: Mitsubishi Electric Corporation, Chiyoda-ku (JP)

(72) Inventors: Satoshi Azuma, Chiyoda-ku (JP); Shuta Ishikawa, Chiyoda-ku (JP); Teruaki Tanaka, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/773,507

(22) PCT Filed: Jan. 31, 2014

(86) PCT No.: PCT/JP2014/052264
§ 371 (c)(1),
(2) Date: Sep. 8, 2015

(87) PCT Pub. No.: WO2014/136510
PCT Pub. Date: Sep. 12, 2014

(65) Prior Publication Data
US 2016/0020687 A1 Jan. 21, 2016

(30) Foreign Application Priority Data

Mar. 8, 2013 (JP) .................................. 2013-046922

(51) Int. Cl.
*H02M 1/36* (2007.01)
*H02M 1/08* (2006.01)
(Continued)

(52) U.S. Cl.
CPC ............... *H02M 1/08* (2013.01); *H02M 1/36* (2013.01); *H02M 7/217* (2013.01); *H02M 7/537* (2013.01); *H02M 7/5387* (2013.01); *H02M 1/38* (2013.01)

(58) Field of Classification Search
CPC ...... H02M 7/537; H02M 1/08; H02M 7/5387; H02M 7/217; B60L 15/2009; B60L 7/14; B60L 2210/10
USPC ............... 363/37, 41, 97, 98, 127, 131, 132; 318/400.02, 805, 800, 807, 809
See application file for complete search history.

(56) References Cited

U.S. PATENT DOCUMENTS 7,804,288 B2 *  9/2010  Ollila ............... H02M 5/4585
                                                            324/713
8,502,524 B2 *  8/2013  Leppanen ........... G01R 19/0092
                                                            324/120

(Continued)

FOREIGN PATENT DOCUMENTS

CN    102237848 A    11/2011
CN    102882413 A    1/2013
(Continued)

OTHER PUBLICATIONS

International Search Report Issued Apr. 22, 2014 in PCT/JP14/052264 Filed Jan. 31, 2014.
(Continued)

*Primary Examiner* — Rajnikant Patel
(74) *Attorney, Agent, or Firm* — Oblon, McClelland, Maier & Neustadt, L.L.P.

(57) ABSTRACT

A power module including: a power conversion unit including N switching-element pairs; and a control circuit. The control circuit receives N command signals, which correspond respectively to the N switching-element pairs, and a shared enable signal. The control circuit is configured to, when the enable signal is negated, execute all-off control of turning off all of the switching elements constituting the power conversion unit, and when the enable signal is asserted, execute normal control, dead-time addition control, and dead-time compensation control for each of the switching-element pairs per period of a corresponding command signal.

15 Claims, 18 Drawing Sheets

(51) Int. Cl.
  *H02M 7/5387* (2007.01)
  *H02M 7/217* (2006.01)
  *H02M 7/537* (2006.01)
  *H02M 1/38* (2007.01)

(56) References Cited

U.S. PATENT DOCUMENTS

| | | | | |
|---|---|---|---|---|
| 8,730,699 | B2* | 5/2014 | Grbovic | H02M 7/1623 |
| | | | | 363/127 |
| 8,829,829 | B2* | 9/2014 | Yoneshima | H02P 6/185 |
| | | | | 318/400.01 |
| 8,963,479 | B2* | 2/2015 | Suzuki | H02P 27/085 |
| | | | | 318/599 |
| 9,374,022 | B2* | 6/2016 | Takamatsu | B60L 7/14 |
| 2011/0273914 | A1 | 11/2011 | Kim | |
| 2012/0206077 | A1 | 8/2012 | Yoneshima et al. | |

FOREIGN PATENT DOCUMENTS

| | | |
|---|---|---|
| JP | 10 304675 | 11/1998 |
| JP | 2001 327171 | 11/2001 |
| JP | 2010 16937 | 1/2010 |
| JP | 2011 188624 | 9/2011 |
| JP | 2011 193543 | 9/2011 |

OTHER PUBLICATIONS

Chinese Office Action dated May 4, 2017, issued in Chinese Patent Application No. 201480012898.2 (with English translation).

* cited by examiner

| EN | COMMAND SIGNAL | CURRENT DIRECTION | OUTPUT OPERATION |
|---|---|---|---|
| ON | ↑ (N→P) | POSITIVE | NORMAL Td ADDITION |
| | ↑ (N→P) | NEGATIVE | EXTEND ON-STATE ON N-SIDE →Td ADDITION |
| | ↓ (P→N) | POSITIVE | EXTEND ON-STATE ON P-SIDE →Td ADDITION |
| | ↓ (P→N) | NEGATIVE | NORMAL Td ADDITION |
| | OTHER THAN EDGE | * | NORMAL (ON/OFF) |
| OFF | * | * | ALL OFF |

FIG.10

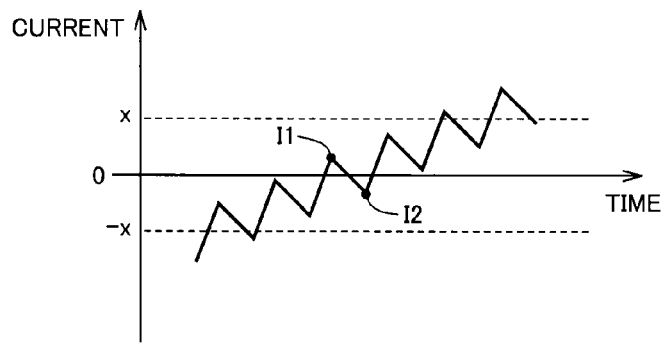

FIG.11

| EN | COMMAND SIGNAL | CURRENT DIRECTION | OUTPUT OPERATION |
|---|---|---|---|
| ON | ↑ (N→P) | POSITIVE | NORMAL Td ADDITION |
| | ↑ (N→P) | NEGATIVE (EXCEPT FOR DEAD ZONE) | EXTEND ON-STATE ON N-SIDE →Td ADDITION |
| | ↑ (N→P) | DEAD ZONE | NORMAL Td ADDITION |
| | ↓ (P→N) | POSITIVE (EXCEPT FOR DEAD ZONE) | EXTEND ON-STATE ON P-SIDE →Td ADDITION |
| | ↓ (P→N) | NEGATIVE | NORMAL Td ADDITION |
| | ↓ (P→N) | DEAD ZONE | NORMAL Td ADDITION |
| | OTHER THAN EDGE | * | NORMAL (ON/OFF) |
| OFF | * | * | ALL OFF |

FIG.14

| EN | COMMAND SIGNAL | CURRENT DIRECTION | OUTPUT OPERATION |
|---|---|---|---|
| ON | ↑ (N→P) | POSITIVE | NORMAL Td ADDITION |
| | ↑ (N→P) | NEGATIVE (EXCEPT FOR DEAD ZONE) | EXTEND ON-STATE ON N-SIDE →Td ADDITION |
| | ↑ (N→P) | NEGATIVE DEAD ZONE | EXTEND ON-STATE ON N-SIDE (SHORTEN EXTENSION TIME) →Td ADDITION |
| | ↓ (P→N) | POSITIVE (EXCEPT FOR DEAD ZONE) | EXTEND ON-STATE ON P-SIDE →Td ADDITION |
| | ↓ (P→N) | POSITIVE DEAD ZONE | EXTEND ON-STATE ON P-SIDE (SHORTEN EXTENSION TIME) →Td ADDITION |
| | ↓ (P→N) | NEGATIVE | NORMAL Td ADDITION |
| | OTHER THAN EDGE | * | NORMAL (ON/OFF) |
| OFF | * | * | ALL OFF |

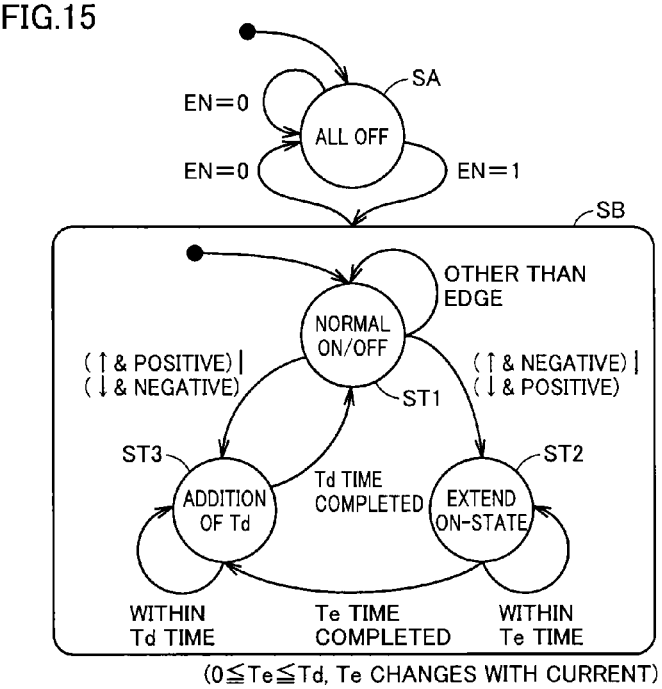

FIG.15

FIG.24
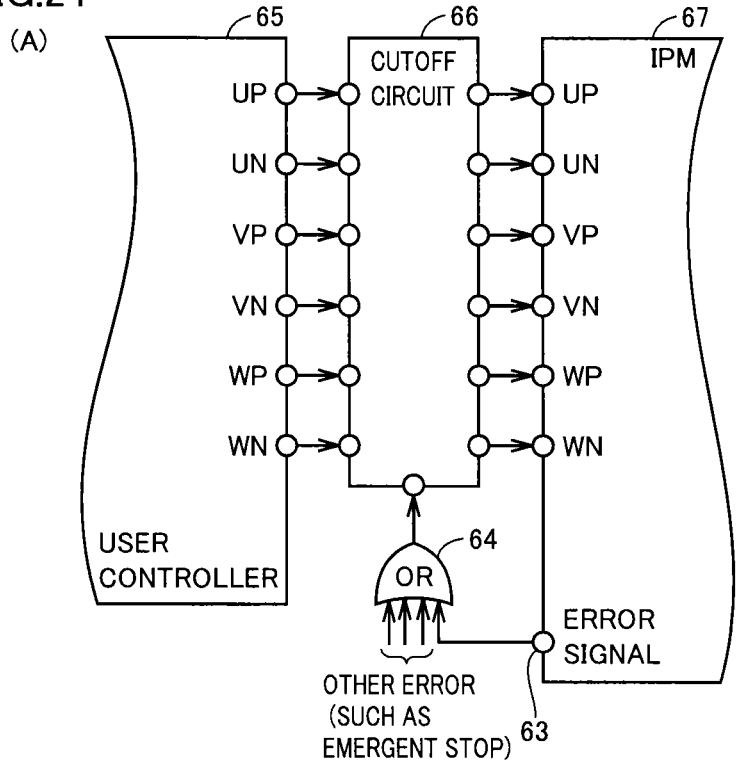
(A)
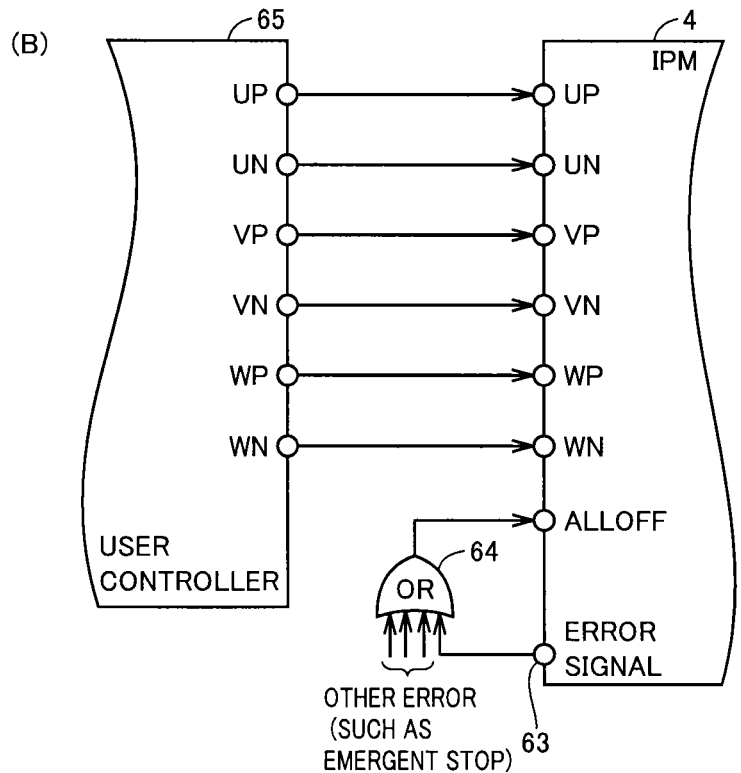
(B)

POWER MODULE

TECHNICAL FIELD

The present invention relates to a power module, and is suitably used for a power module having a DC-AC conversion function or an AC-DC conversion function, for example.

BACKGROUND ART

In a power module (IPM: Intelligent Power Module) used for an inverter and a converter, the number of input signals is desirably reduced for miniaturization.

According to a three-phase PWM (Pulse Width Modulation) inverter disclosed in Japanese Patent Laying-Open 2001-327171 (PTD 1), three PWM signals for a U-phase, a V-phase, and a W-phase and an off signal for turning off all of power elements are inputted. A signal generation circuit provided therein generates three phase-inverted PWM inversion signals based on three PWM signals. Switching of six power elements is controlled by these PWM signals and PWM inversion signals. Further, the inverter in this document is provided with a circuit for producing a dead time so that an on-period of an inputted PWM signal and an on-period of a PWM inversion signal corresponding to the PWM signal do not overlap with each other.

CITATION LIST

Patent Document

PTD 1: Japanese Patent Laying-Open No. 2001-327171
PTD 2: Japanese Patent Laying-Open No. 10-304675

SUMMARY OF INVENTION

Technical Problem

When a dead time is provided to a PWM signal, it may cause a deviation from an output current waveform which was originally intended to be obtained by a control. A dead-time compensation technique for compensating a distortion in an output voltage waveform due to this dead time has been conventionally known (for example, refer to Japanese Patent Laying-Open No. 10-304675 (PTD 2)). However, Japanese Patent Laying-Open No. 2001-327171 (PTD 1) described above does not specifically disclose how to incorporate the dead-time compensation function into a power module.

A main object of the present invention is to provide a power module capable of reducing the number of input signals and compensating an output voltage distortion due to an addition of a dead time.

Solution to Problem

A power module in accordance with one embodiment includes a power conversion unit and a control circuit. The power conversion unit includes N switching-element pairs each constituted of first and second switching elements connected in series, and a plurality of diodes each connected in inverse-parallel with each of the first and second switching elements. The control circuit receives N command signals, which correspond respectively to the N switching-element pairs, and a shared enable signal. The control circuit is configured to, when the enable signal is negated, execute all-off control of turning off all of the first and second switching elements, and when the enable signal is asserted, execute normal control, dead-time addition control, and dead-time compensation control for each of the switching-element pairs per period of a corresponding command signal. Under the dead-time addition control, the control circuit turns off the first and second switching elements during a predetermined dead time. After the dead-time addition control, the control circuit executes the normal control of turning on one of the first and second switching elements and turning off the other in accordance with a logical value of the corresponding command signal. When a logical value of a corresponding command signal is switched, the control circuit shifts from executing the normal control to executing the dead-time addition control or to executing the dead-time compensation control of maintaining the state of the last normal control, depending on a direction of a change in the logical value and a polarity of a load current outputted from a connection node of the first and second switching elements. After the dead-time compensation control, the control circuit executes the dead-time addition control.

Advantageous Effects of Invention

According to the power module of the embodiment described above, the number of input signals can be reduced, and an output voltage distortion due to an addition of a dead time can be compensated.

BRIEF DESCRIPTION OF DRAWINGS

FIG. 10 is a diagram for illustrating a problem in the power module of the second embodiment.

FIG. 11 represents, in a table format, an output operation of each control unit in accordance with a corresponding command signal and a direction of a load current in a power module in accordance with the third embodiment.

FIG. 14 represents, in a table format, an output operation of each control unit in accordance with a corresponding command signal and a direction of a load current in the power module of a fourth embodiment.

FIG. 15 is a state transition diagram representing an operation of each control unit in the power module in accordance with the fourth embodiment.

FIG. 24 is a diagram for illustrating one example of a method of using the power module of FIG. 23.

DESCRIPTION OF EMBODIMENTS

Figure 1:
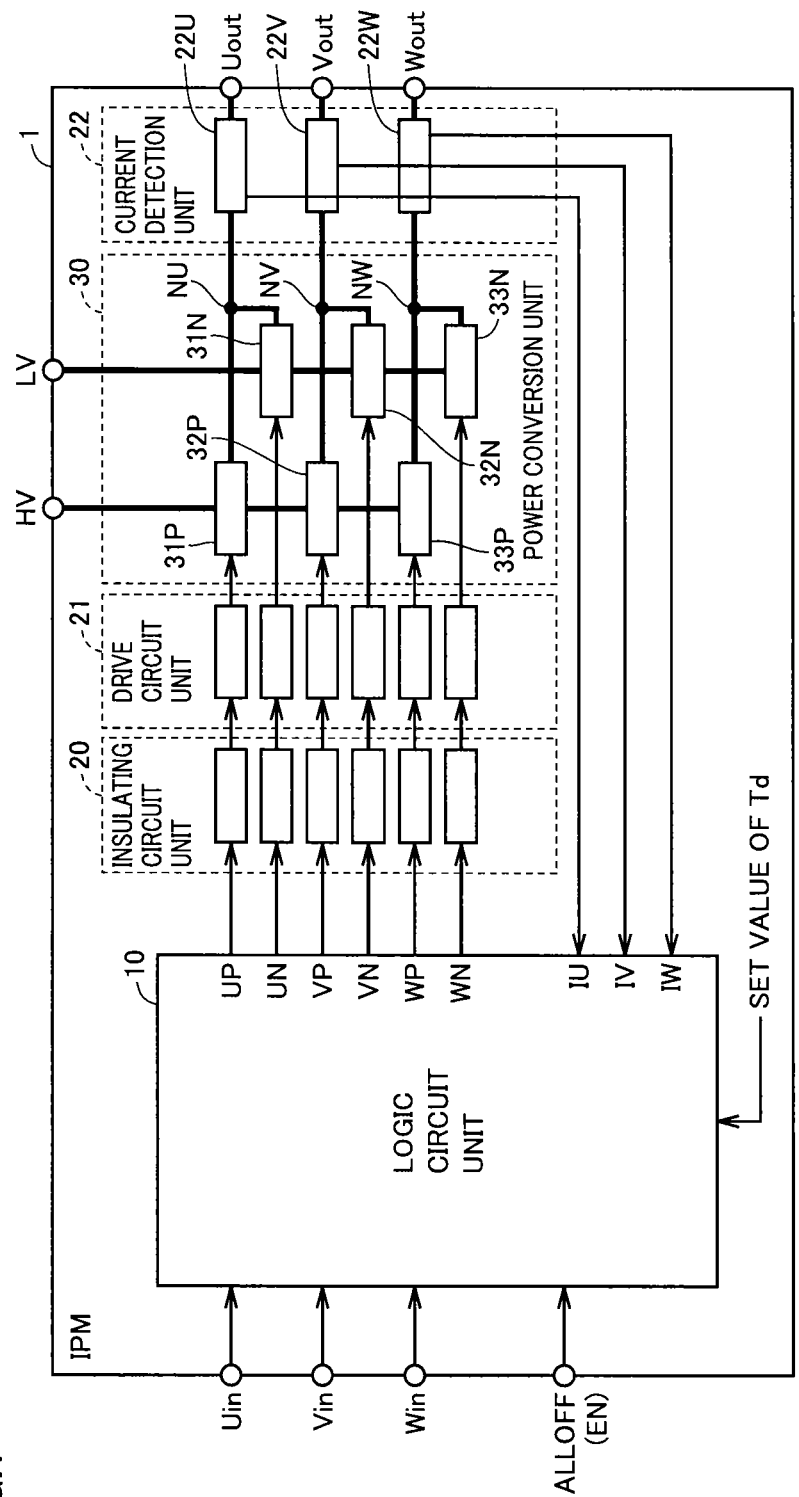
FIG. 1 is a block diagram representing a configuration of a power module in accordance with a first embodiment.

In the following paragraphs, each embodiment will be described in detail with reference to the drawings. It should be noted that the same or corresponding parts have the same reference numerals allotted, and description thereof will not be repeated.

First Embodiment

[Entire Configuration of Power Module]

FIG. 1 is a block diagram representing a configuration of a power module in accordance with a first embodiment. FIG. 1 represents the case of a three-phase inverter as an example of the power module.

Referring to FIG. 1, a power module 1 includes a power conversion unit 30, a logic circuit unit 10 (also referred to as a control circuit unit), an insulating circuit unit 20, a drive circuit unit 21, and a current detection unit 22.

Further, power module 1 includes terminals (also referred to as a Uin terminal, a Vin terminal, and a Win terminal) to which a U-phase command signal Uin, a V-phase command signal Vin, and a W-phase command signal are respectively inputted from outside, and a terminal (also referred to as an EN terminal) to which an all-off signal ALLOFF (also referred to as an enable signal EN) is inputted from outside. Power module 1 further includes a high-potential side power supply terminal HV, a low-potential side power supply terminal LV, and output terminals Uout, Vout, Wout for respectively outputting a U-phase load current IU, a V-phase load current TV, and a W-phase load current IW.

Figure 2:
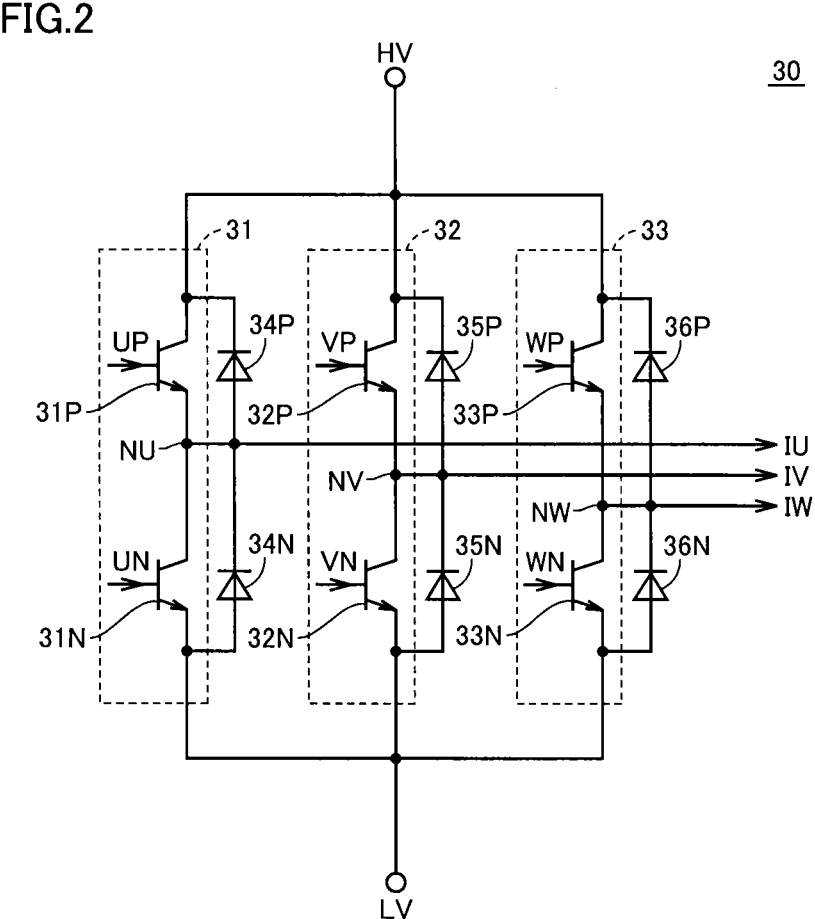
FIG. 2 is a circuit diagram representing a detailed configuration of a power conversion unit of FIG. 1.

FIG. 2 is a circuit diagram representing a detailed configuration of the power conversion unit of FIG. 1. Power conversion unit 30 converts direct-current voltage inputted from power supply terminals HV, LV into three-phase alternating-current voltages.

Referring to FIG. 2, power conversion unit 30 includes switching-element pairs 31, 32, 33 connected to each other in parallel, and a plurality of diodes connected individually in inverse-parallel to switching elements constituting each switching-element pair. Herein, the inverse-parallel means that a diode is in parallel with and in a reverse direction with a corresponding switching element. In other words, a cathode of the diode is connected to the high-potential side, and an anode of the diode is connected to the low-potential side.

Specifically, switching-element pair 31 includes a first switching element (also referred to as a high-potential side switching element or an upper arm side switching element) 31P and a second switching element (also referred to as a low-potential side switching element or a lower arm side switching element) 31N, which are connected in series between power supply terminals HV, LV. U-phase load current IU is outputted from a connection node NU of switching elements 31P, 31N. Control signals UP, UN are respectively inputted to control electrodes of switching elements 31P, 31N. Switching elements 31P, 31N are switched to on or off in accordance with logical values of control signals UP, UN. Further, diodes 34P, 34N are respectively connected to switching elements 31P, 31N in inverse-parallel. A reflux current flows to the diode when the corresponding switching element is in an off-state.

Similarly, switching-element pair 32 includes switching elements 32P, 32N connected in series between power supply terminals HV, LV. V-phase load current IV is outputted from a connection node NV of switching elements 32P, 32N. V-phase control signals VP, VN are respectively inputted to control electrodes of switching elements 32P, 32N. Diodes 35P, 35N are respectively connected to switching elements 32P, 32N in inverse-parallel.

Similarly, switching-element pair 33 includes switching elements 33P, 33N connected in series between power supply terminals HV, LV. W-phase load current IW is outputted from a connection node NW of switching elements 33P, 33N. W-phase control signals WP, WN are respectively inputted to control electrodes of switching elements 33P, 33N. Diodes 36P, 36N are respectively connected to switching elements 33P, 33N in inverse-parallel.

Each switching element is turned on when a corresponding control signal is asserted, and is turned off when a corresponding control signal is negated. In FIG. 2, an example of an NPN type bipolar transistor is illustrated as each switching element. However, in place of this, it may be a power MOS (Metal Oxide Semiconductor) transistor, an IGBT (Insulated Gate Bipolar Transistor), or the like.

As to polarities of a load current described above, in this specification, a current direction of flowing out from power conversion unit 30 is positive, and a current direction of flowing into power conversion unit 30 is negative.

Referring back to FIG. 1, logic circuit unit 10 generates control signals UP, UN, VP, VN, WP, WN for controlling switching of each switching element in accordance with command signals Uin, Vin, Win of respective phases, enable signal EN, and polarities of load currents IU, IV, IW. A detailed configuration and operation of logic circuit unit 10 will be described later with reference to FIGS. 3 to 5.

Control signals UP, UN, VP, VN, WP, WN outputted from logic circuit unit 10 pass through insulating circuit unit 20 for separation of input and output, and thereafter are amplified by drive circuit unit 21. Amplified control signals UP, UN, VP, VN, WP, WN are respectively inputted to control electrodes of switching elements 31P, 31N, 32P, 32N, 33P, 33N.

A current detection unit 22 is provided to detect information including a polarity of each load current, and includes a detector 22U for detecting U-phase load current IU, a detector 22V for detecting V-phase load current IV, and a detector 22W for detecting W-phase load current IW. Since a sum total of load currents for three phases becomes 0 in accordance with Kirchhoff's current rule, detectors may be provided for any two phases among three phases, and a load current for the remaining one phase may be calculated based on the detected load currents for two phases.

It should be noted that current detection unit 22 may be provided outside of power module 1, and information related to load currents IU, IV, IW for three phases (or load currents for any two phases among those) may be obtained from current detection unit 22 provided outside.

[Configuration of Logic Circuit Unit]

Figure 3:
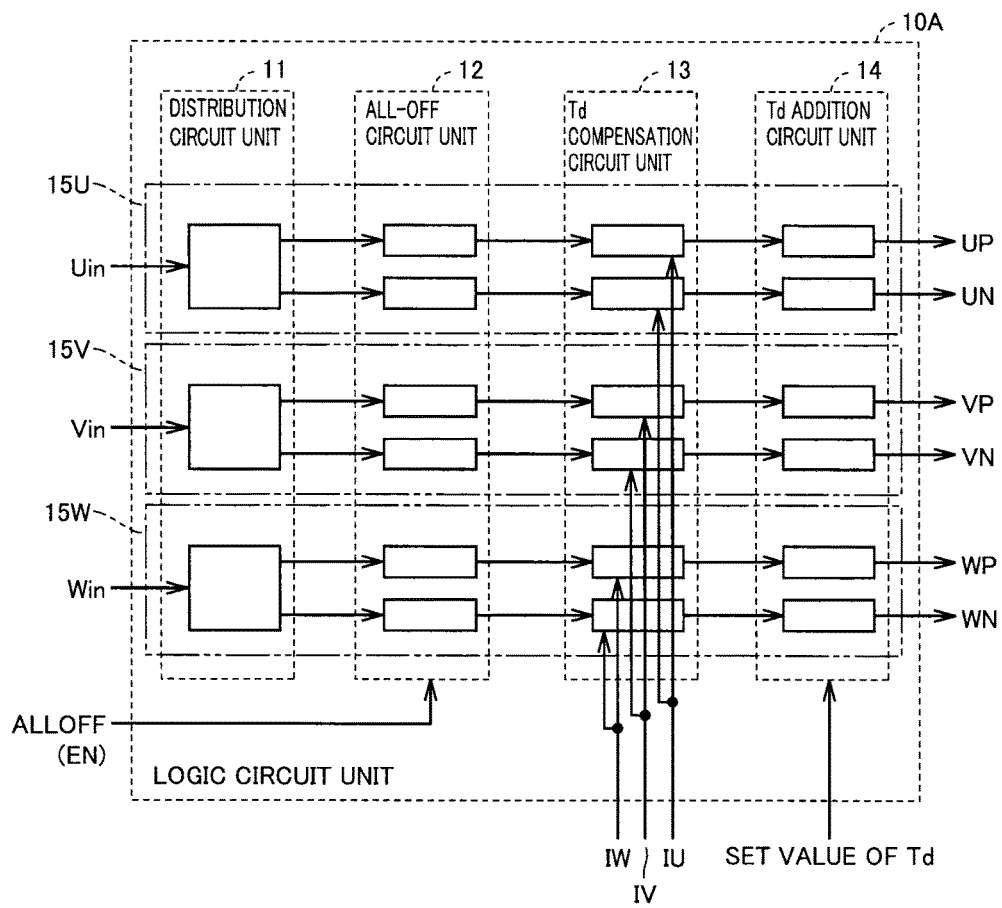
FIG. 3 is a block diagram representing one example of a detailed configuration of a logic circuit of FIG. 1.

FIG. 3 is a block diagram representing one example of a detailed configuration of logic circuit unit 10 of FIG. 1. Referring to FIG. 3, a logic circuit unit 10A includes a signal distribution circuit unit 11, an all-off circuit unit 12, a dead-time (Td) compensation circuit unit 13, and a dead-time (Td) addition circuit unit 14.

Signal distribution circuit unit 11 generates control signals UP, VP, WP for N (N=3) high-potential side switching elements respectively synchronized with N (N=3) command signals Uin, Vin, Win (in other words, each having the same phase as a corresponding command signal), and control signals UN, VN, WN for low-potential side switching elements obtained by inverting the phases of N (N=3) command signals Uin, Vin, Win. It should be noted that, contrary to the case of the present embodiment, control signals UP, VP, VN may be signals obtained by inverting command signals Uin, Vin, Win, and control signals UN, VN, WN may be signals synchronized with command signals Uin, Vin, Win.

All-off circuit unit 12 negates all of control signals UP, UN, VP, VN, WP, WN generated by signal distribution circuit unit 11 regardless of logical values of command signals Uin, Vin, Win when an all-off signal is asserted (in other words, when enable signal EN is negated). Accordingly, all of switching elements 31P, 31N, 32P, 32N, 33P, 33N constituting power conversion unit 30 of FIG. 1 are turned off.

Dead-time addition circuit unit 14 delays switching from negation to assertion by a predetermined dead time Td for each of control signals UP, UN, VP, VN, WP, WN generated by signal distribution circuit unit 11. Consequently, for each of the U-phase, V-phase, and W-phase, a dead time period of turning off both of the high-potential side switching element and low-potential side switching element occurs when the logical values are switched. Accordingly, a short circuit state (a state in which both of the high-potential side switching element and low-potential side switching element are turned on) which occurs due to a signal delay can be prevented securely.

It should be noted that a set value of dead time Td may be given from outside of the power module or may be given by a register provided in the power module. A value of dead time Td is set to be, for example, 1μ second to securely prevent the short circuit state.

Since providing the dead time can shorten the assertion period of each control signal as compared to the assertion period of the command signal, a distortion occurs in the output voltage of power conversion unit 30. Dead-time compensation circuit unit 13 is provided to suppress the distortion in the output voltage.

When the logical value of the U-phase command signal is switched, dead-time compensation circuit unit 13 extends the assertion period of one of U-phase control signals UP, UN generated by signal distribution circuit unit 11 and extends the negation period of the other of U-phase control signals UP, UN in accordance with a direction of a change and a polarity of U-phase load current IU. Consequently, the timing of switching each of the control signals UP, UN is delayed at any of a rise and a fall in the U-phase command signal.

Specifically, dead-time compensation circuit unit 13 extends the assertion period of U-phase control signal UP supplied to high-potential side switching element 31P when U-phase load current IU is positive, and extends the assertion period of U-phase control signal UN supplied to low-potential side switching element 31N when U-phase load current IU is negative. The extension period is equal to the dead-time period. It should be noted that the effect of the dead-time compensation can be mostly obtained even when the extension period is set to be slightly shorter than the dead-time period.

The cases of the V-phase and W-phase are also similar to the case of the U-phase. Specifically, dead-time compensation circuit unit 13 extends the assertion period of high-potential side V-phase control signal VP when V-phase load current IV is positive, and extends the assertion period of low-potential side V-phase control signal VN when V-phase load current IV is negative. Dead-time compensation circuit unit 13 extends the assertion period of high-potential side W-phase control signal WP when W-phase load current IW is positive, and extends the assertion period of low-potential side W-phase control signal WN when W-phase load current IW is negative. More detailed operation of dead-time compensation circuit unit 13 will be described later with reference to FIGS. 4 and 5.

Control signals UP, UN, VP, VN, WP, WN having passed through all-off circuit unit 12, dead-time compensation circuit unit 13, and dead-time addition circuit unit 14 are outputted from logic circuit unit 10 of FIG. 1. In FIG. 3, dead-time compensation circuit unit 13 is arranged in a fore stage of dead-time addition circuit unit 14. However, the order may be inverted. In FIG. 3, all-off circuit unit 12 is arranged in a rear stage of signal distribution circuit unit 11. However, all-off circuit unit 12 may be arranged in a rear stage of dead-time compensation circuit unit 13 or may be arranged in a rear stage of dead-time addition circuit unit 14.

It should be noted that since a signal processing for each of the U-phase, V-phase, and W-phase is independent, the configuration of logic circuit unit 10A may be regarded as a configuration including U-phase control unit 15U, V-phase control unit 15V, and W-phase control unit 15W. In this case, U-phase control unit 15U generates U-phase control signals UP, UN, based on U-phase command signal Uin, enable signal EN, and information as to a polarity of U-phase load current IU. V-phase control unit 15V generates V-phase control signals VP, VN, based on V-phase command signal Vin, enable signal EN, and information as to a polarity of V-phase load current IV. W-phase control unit 15W generates W-phase control signals WP, WN, based on W-phase command signal Win, enable signal EN, and information as to a polarity of W-phase load current IW.

[Operation of Logic Circuit Unit]

Figure 4:
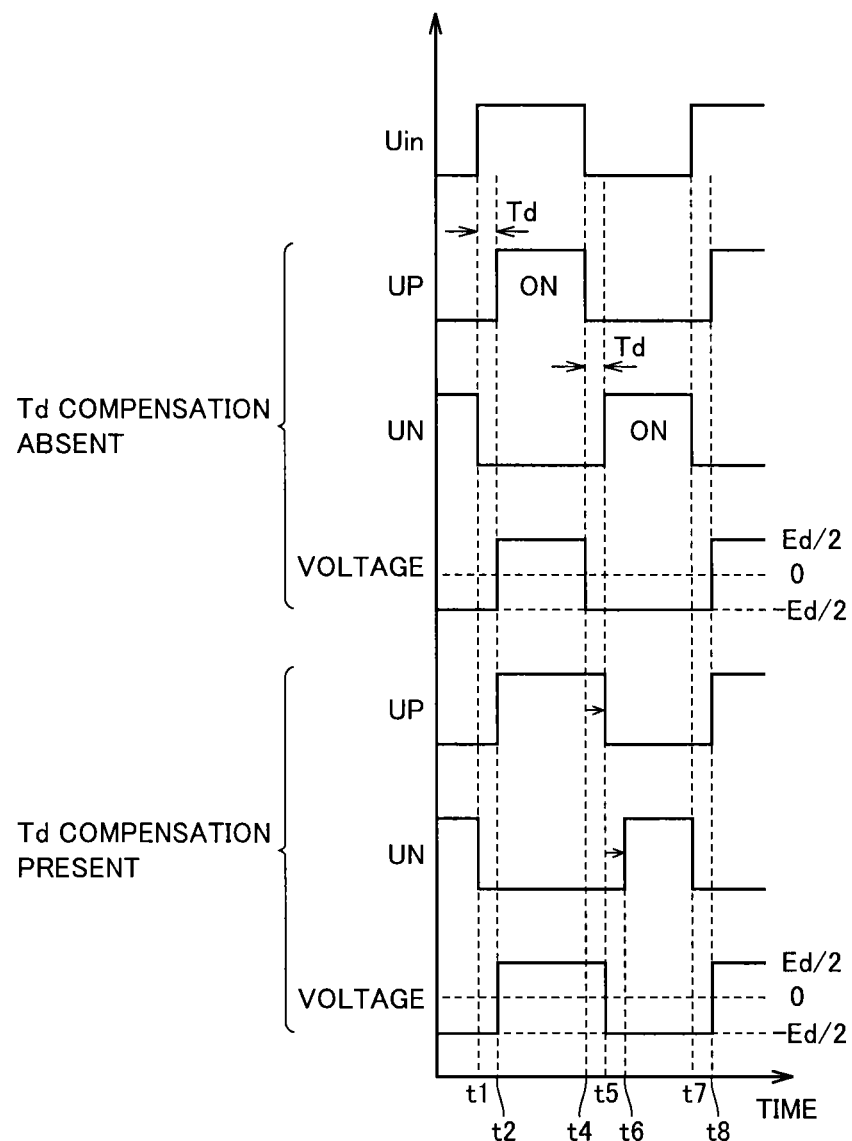
FIG. 4 is a timing chart representing an operation of a U-phase control unit of FIG. 3 in the case where a U-phase load current is positive.
Figure 5:
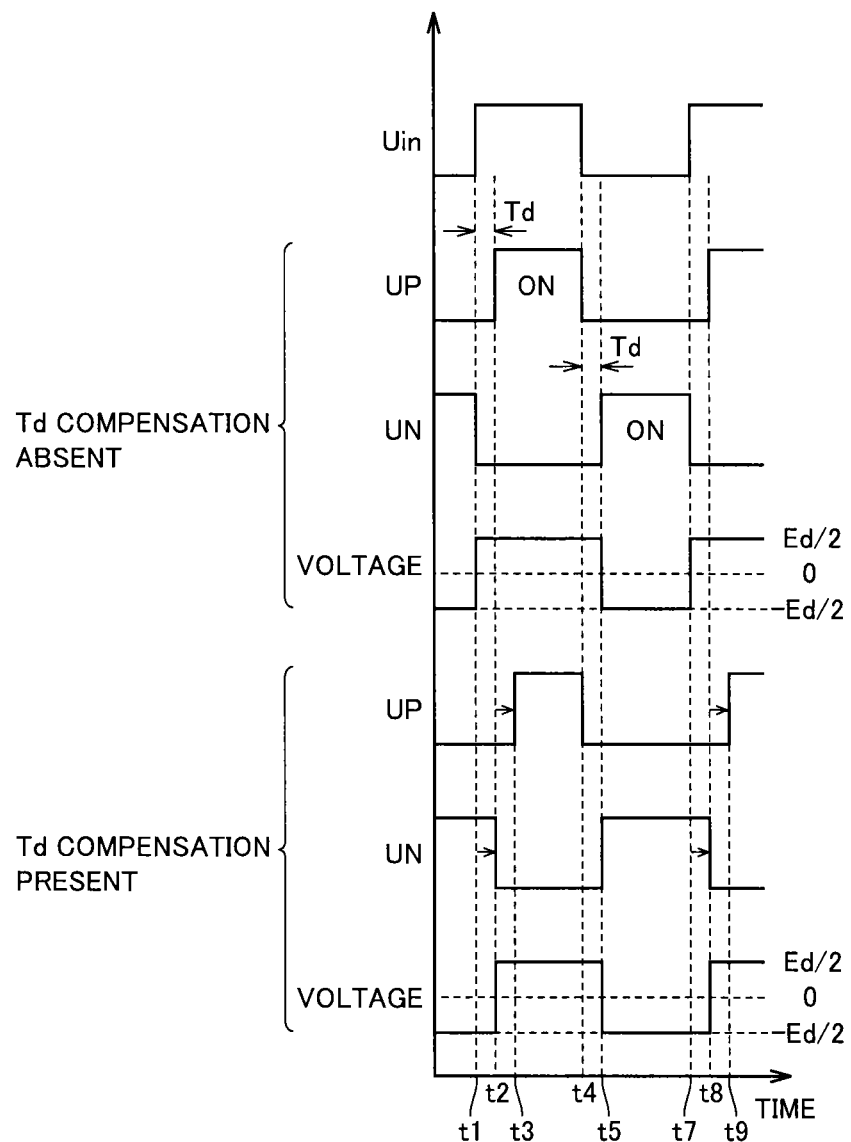
FIG. 5 is a timing chart representing an operation of a U-phase control unit of FIG. 3 in the case where a U-phase load current is negative.

Next, an operation of logic circuit unit 10A of FIG. 3, particularly operations of dead-time compensation circuit unit 13 and dead-time addition circuit unit 14 will be described specifically with reference to timing charts of FIGS. 4 and 5. In FIGS. 4 and 5, a signal processing of the U-phase (an operation of U-phase control unit 15U of FIG. 3) is illustrated. However, it similarly applies to the cases of the V-phase and W-phase.

(1) The Case Where U-Phase Load Current IU is Positive

FIG. 4 is a timing chart representing an operation of the U-phase control unit of FIG. 3 in the case where the U-phase load current is positive. In FIG. 4, an operation in the case of not performing the dead-time compensation and an operation in the case of performing the dead-time compensation are illustrated by comparison.

(1-1) The Case of Not Performing the Dead-Time Compensation

Before time t1, command signal Uin is at an L level. At this time, control signal UP supplied to high-potential side switching element 31P of FIG. 2 is at the L level (negation), and control signal UN supplied to low-potential side switching element 31N is at an H level (assertion). Accordingly, switching element 31P is turned off, and switching element 31N is turned on.

When command signal Uin is switched from the L level to the H level at time t1, control signal UN is immediately changed to the L level (negation), but control signal UP is changed to the H level (assertion) after time t2. During dead time Td from time t1 to time t2, the dead-time addition control of turning off both of switching elements 31P, 31N is performed.

From time t2 to time t4, control signal UP maintains the H level (assertion), and control signal UN maintains the L level (negation) in response to command signal Uin at the H level. Accordingly, the normal control of turning on high-potential side switching element 31P and turning off low potential side switching element 31N is performed.

When command signal Uin is switched from the H level to the L level at time t4, control signal UP is immediately changed to the L level (negation), but control signal UN is changed to the H level (assertion) after time t5. During dead time Td from time t4 to time t5, the dead-time addition control of turning off both of switching elements 31P, 31N is performed.

From time t5 to time t7, control signal UP maintains the L level (negation), and control signal UN maintains the H level (assertion) in response to command signal Uin at the L level. Accordingly, the normal control of turning off high-potential side switching element 31P and turning on low-potential side switching element 31N is performed.

When command signal Uin is switched from the L level to the H level again at time t7, control signal UN is immediately changed to the L level (negation), but control signal UP is changed to the H level (assertion) after time t8. During dead time Td from time t7 to time t8, the dead-time addition control of turning off both of switching elements 31P, 31N is performed.

Next, a change in an output voltage of a U-phase output terminal Uout of power conversion unit 30 of FIG. 2 (in other words, a potential of connection node NU of switching-element pair 31) will be described. Herein, a potential of Ed/2 is applied to high-potential side power supply terminal HV of FIG. 2, and a potential of −Ed/2 is applied to low-potential side power supply terminal LV.

From time t2 to time t4 and after time t8, high-potential side switching element 31P of FIG. 2 is in the on-state, and low-potential side switching element 31N is in the off-state. Therefore, the U-phase output voltage is equal to Ed/2. Before time t1 and from time t5 to t7, high-potential side switching element 31P of FIG. 2 is in the off-state, and low-potential side switching element 31N is in the on-state. Therefore, the U-phase output voltage is equal to −Ed/2.

On the other hand, since load current IU is positive during the dead-time period (from time t1 to time t2, from time t4 to time t5, and from time t7 to time t8), low-potential side diode 34N of FIG. 2 is conducted. Consequently, the U-phase output voltage is equal to −Ed/2. Thus, as compared with U-phase command signal Uin, the time in which the U-phase output voltage is at the high level is reduced by the dead time, and the time in which the U-phase output voltage is at the low level is increased by the dead time per period of command signal Uin, a distortion occurs in the output voltage.

(1-2) The Case of Performing the Dead-Time Compensation

When load current IU is positive, dead-time compensation circuit unit 13 extends the on-time of high-potential side switching element 31P of FIG. 2 by the dead-time. Specifically, when U-phase command signal Uin falls (time t4), dead-time compensation circuit unit 13 delays a fall of high-potential side control signal UP until time t5 (along with this, the negation period of low-potential side control signal UN is also extended). In other words, from time t4 to time t5 in which the dead-time compensation control is performed, the logical values of control signals UN, UP for the last normal control (from time t2 to time t4) are maintained. The maintaining time for maintaining the logical values is equal to dead time Td. After the termination of the dead-time compensation control (time t5), it is shifted to the dead-time addition control (from time t5 to time t6). The control in other time zones is the same as that in the case of not performing the dead-time compensation. Therefore, description will not be repeated.

(2) The Case Where U-Phase Load Current IU Is Negative

FIG. 5 is a timing chart representing an operation of the U-phase control unit of FIG. 3 in the case where the U-phase load current is negative. In FIG. 5, the operation in the case of not performing the dead-time compensation and the operation in the case of performing the dead-time compensation are illustrated by comparison.

(2-1) The Case of Not Performing the Dead-Time Compensation

The waveforms of control signals UP, UN in the case of not performing the dead-time compensation is the same as those in the case, described in FIG. 4, where load current IU is negative. Therefore, description will not be repeated.

On the other hand, as to the U-phase output voltage, the waveform during the dead-time period (from time t1 to time t2, from time t4 to time t5, and from time t7 to t8) is different from the waveform in the case of FIG. 4. In the case of FIG. 5, since load current IU is negative, high-potential side diode 34P of FIG. 2 is conducted during the dead-time period. Consequently, the U-phase output voltage is equal to Ed/2. Thus, comparing with U-phase command signal Uin, the time with a high level of U-phase output voltage increases by the dead time, and the time with a low level decreases by the dead time per one period, so that a distortion occurs in the output voltage.

(2-2) The Case of Performing the Dead-Time Compensation

When load current IU is negative, dead-time compensation circuit unit 13 extends the on-time of low-potential side switching element 31N of FIG. 2 by the dead time. Specifically, when U-phase command signal Uin rises (times t1, t7), dead-time compensation circuit unit 13 delays a fall of low-potential side control signal UN until times t2, t8 respectively (along with this, the negation period of high-potential side control signal UP is also extended). In other words, from time t1 to time t2 and from time t7 to time t8 in which the dead-time compensation control is performed, the logical values of control signals UN, UP during the last normal control (before time t1, and from time t5 to time t7) are maintained. The maintaining time for maintaining this logical values is equal to dead time Td. After the termination of the dead-time compensation control (times t2, t8), it is shifted to the dead-time addition control (from time t2 to time t3, and from time t8 to time t9). The control in other time zone is the same as that in the case of not performing the dead-time compensation.

[Effect]

As described above, according to the power module of the first embodiment, the number of input signals can be reduced, and the output voltage distortion due to addition of the dead time can be compensated.

Second Embodiment

Figures 6, 7:
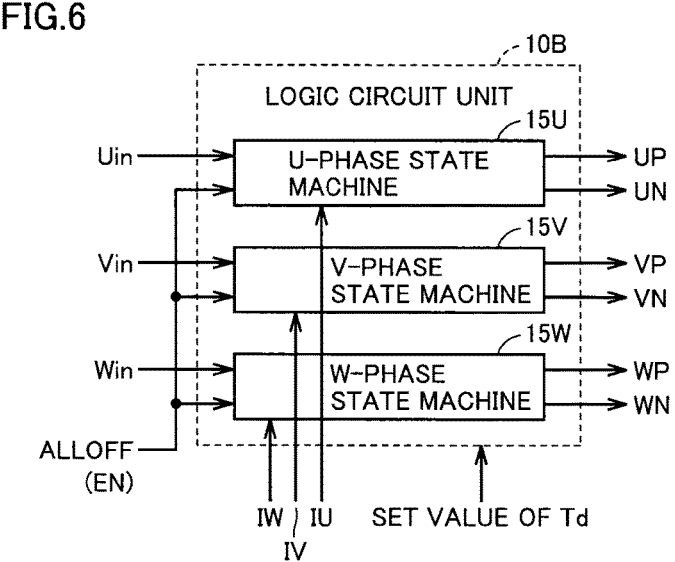
FIG. 6 is a block diagram representing a configuration of a logic circuit unit in a power module in accordance with a second embodiment.
FIG. 7 represents, in a table format, an output operation of each control unit in accordance with a corresponding command signal and a direction of a load current in the power module of the second embodiment.

FIG. 6 is a block diagram representing a configuration of a logic circuit unit in a power module in accordance with the second embodiment. Referring to FIG. 6, a logic circuit unit 10B includes N (N=3) control units (a U-phase control unit 15U, a V-phase control unit 15V, and a W-phase control unit 15W) respectively corresponding to N (N=3) switching-element pairs 31, 32, 33 of FIG. 2.

In the second embodiment, these control units 15U, 15V, 15W are configured as state machines. In other words, each control unit has four internal states, shifts between the internal states, in accordance with a corresponding command signal (Uin, Vin, Win), a shared enable signal EN, and polarities of a corresponding load current (IU, IV, IW), and outputs a control signal to a corresponding switching-element pair (31, 32, 33) in accordance with the internal states. Each control unit performs the normal control, the dead-time compensation control, the dead-time addition control, and the all-off control described in the first embodiment respectively in the four internal states.

FIG. 7 represents, in a table format, output operations of each control unit in accordance with corresponding command signals and directions of load currents in the power module of the second embodiment.

(1) The Case Where an Enable Signal Is Asserted (ON)

When a rising edge (↑) of a corresponding command signal is provided (in other words, a corresponding command signal changes from a low potential (N) to a high potential (P)), and a corresponding load current is positive, each control unit performs the dead time Td addition control.

When a rising edge (↑) of a corresponding command signal is provided, and a corresponding load current is negative, each control unit performs the dead-time compensation control of extending an on-state of a switching element on a low potential side (N-side) (and at the same time extending an off-state of the switching element on a high-potential side (P-side)). After the dead-time compensation control, it is shifted to the dead-time addition control.

When a falling edge (↓) of a corresponding command signal is provided (in other words, a corresponding command signal is changed from a high-potential (P) to a low-potential (N)), and a corresponding load current is positive, each control unit performs the dead-time compensation control of extending an on-state of the switching element on the high-potential side (P-side) (and at the same time extending an off-state of the switching element on the low-potential side (N-side)). After the dead-time compensation control, it is shifted to the dead-time addition control.

When a falling edge (↓) of a corresponding command signal is provided, and a load current is negative, each control unit performs the dead-time addition control.

After the dead-time addition control, each control unit performs the normal control of turning on one of the corresponding high-potential side switching element and low-potential side switching element and turning off the other in accordance with the logical value of the corresponding command signal. The direction of the corresponding load current (polarity) does not affect the output of each control unit (it is represented as "*" in FIG. 7).

(2) The Case Where the Enable Signal Is Negated (OFF)

Each control unit performs the all-off control of turning off all of the corresponding switching elements regardless of the logical value of the corresponding command signal and the polarity of the corresponding load current (it is represented as "*" in FIG. 7).

Figure 8:
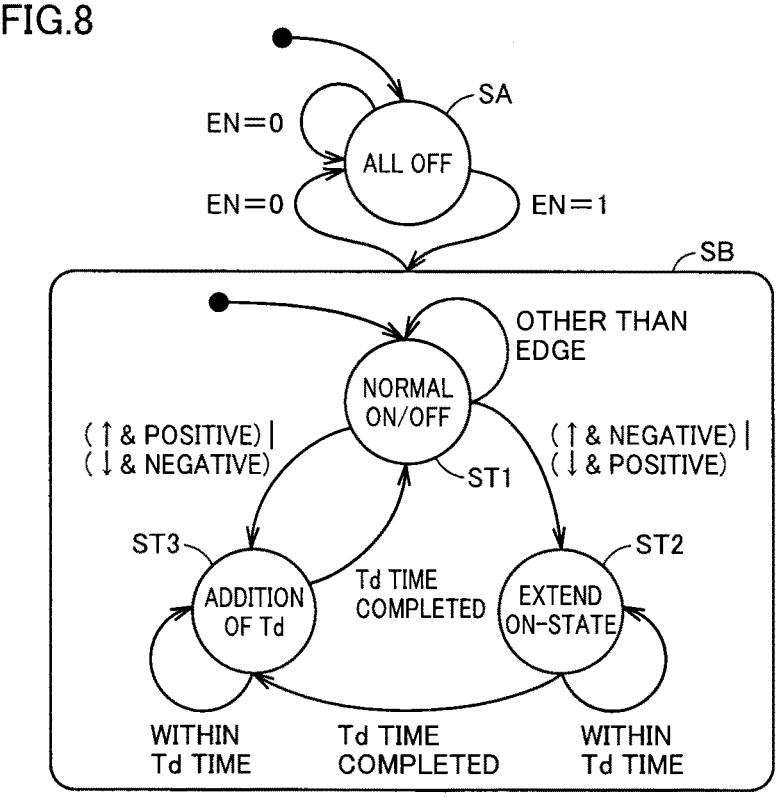
FIG. 8 is a state transition diagram representing an operation of each control unit in the power module in accordance with the second embodiment.

FIG. 8 is a state transition diagram representing operations of each control unit in the power module in accordance with the second embodiment. In FIG. 8, "&" represents an AND operation, and "|" represents an OR operation.

Referring to FIG. 8, each control unit has four internal states ST1, ST2, ST3, SA. It should be noted that internal states ST1, ST2, ST3 are collectively described as an internal state SB in FIG. 8. When enable signal EN is negated (EN=0), each control unit is shifted to internal state SA, and performs the all-off control of turning off all of the switching elements. When enable signal EN is asserted (EN=1), each control unit shifts internal states ST1, ST2, ST3 per one period of the corresponding command signal (to be exact, there are a case where it is shifted in the order of internal states ST1, ST3, ST1 per half a period, and a case where it is shifted in the order of internal states ST1, ST2, ST3, ST1 per half a period).

In internal state ST3, each control unit performs the dead-time addition control of turning off both of the corresponding high-potential side and low-potential side switching elements. When predetermined dead time Td has elapsed, it is shifted from internal state ST3 to internal state ST1.

In internal state ST1, each control unit performs the normal control of turning on one of the high-potential side switching element and low-potential side switching element and turning off the other in accordance with the logical value of the corresponding command signal.

When the logical value of the corresponding command signal is switched, in accordance with the direction of the change in the logical value and the polarities of the corresponding load currents, it is shifted from internal state ST1 of performing the normal control to internal state ST3 of performing the dead-time addition control, or to internal state ST2 of performing the dead-time compensation control of maintaining the state of the last normal control.

Specifically, when the following first condition or second condition is satisfied, each control unit shifts from internal state ST1 to internal state ST2, and when neither the first condition nor second condition is satisfied, each control unit shifts from internal state ST1 to internal state ST3. The first condition is the case where the high-potential side switching element is in the on-state and the corresponding load current is positive in the last normal control (internal state ST1). In other words, the first condition is the case where the falling edge (↓) of the corresponding command signal is provided and the corresponding load current is positive. The second condition is the case where the low-potential side switching element is in the on-state and the corresponding load current is negative in the last normal control. In other words, the second condition is the case where the rising edge (↑) of the corresponding command signal is provided and the corresponding load current is negative.

In internal state ST2, when the maintaining time for maintaining the state of the switching element in the last normal control has elapsed, it is shifted to internal state ST3. In the case of the second embodiment, the maintaining time is set to be equal to the period of dead time Td. It should be noted that the effect of the present invention can be generally obtained even when the maintaining time described above is set to be slightly shorter than the period of dead time Td.

Figure 9:
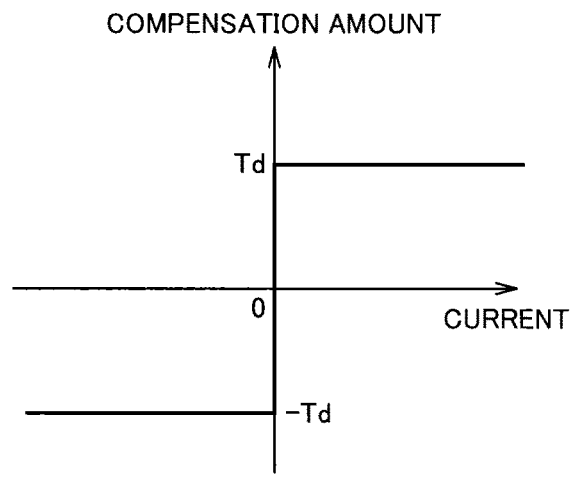
FIG. 9 represents a relationship between a load current and a dead-time compensation amount in the power module in accordance with the second embodiment.

FIG. 9 represents a relationship between the load current and the dead-time compensation amount in the power module in accordance with the second embodiment. In FIG. 9, the load current is denoted in the horizontal axis, and the dead-time compensation amount is denoted in the vertical axis. Herein, the dead-time compensation amount means a length of the period in which the dead-time compensation control is performed (the aforementioned maintaining time or extension time). In addition, the extension time of the on-state of the high-potential side switching element is represented by positive, and the extension time in the on-state of the low-potential side switching element is represented by negative. As shown in FIG. 9, in either cases of the high-potential side and low-potential side switching elements, the extension time of the on-time is equal to the period of dead time Td.

As described above, according to the power module of the second embodiment, the number of the input signals can be reduced, and the output voltage distortion due to addition of the dead time to the control signal can be compensated, similarly to the case of the first embodiment. Further, since logic circuit unit 10B is constituted of a state machine, an area of the logic circuit unit can be reduced more than the case of the first embodiment.

Third Embodiment

FIG. 10 is a diagram for illustrating the problem of the power module of the second embodiment. In FIG. 10, in the case where the control signal is a PWM (Pulse Width Modulation) signal, one example of the output current waveform (load current waveform) from the power conversion unit is shown schematically. As shown in FIG. 10, since each switching element repeats on and off at a carrier frequency in the case of the PWM control, fine vibration waveform overlaps with the current waveform. In FIG. 10, at the points of a current I1 and a current I2, since it is in the mode in which the actual output voltage can be immediately changed with the change in command signal Uin, the dead-time compensation would not be necessary. In this case, implementing unnecessary dead-time compensation causes a problem of distorting the output current waveform.

In the power module of the third embodiment, to solve the problem described above, each control unit does not perform the dead-time compensation control when an absolute value of a corresponding load current is less than a predetermined threshold value (it is referred to as a "dead zone"). Hereinafter, it will be described in detail with reference to FIGS. 11 to 13.

FIG. 11 represents, in a table format, output operations of each control unit in accordance with a corresponding command signal and a direction of a load current in the power module according to the third embodiment. The point different from the table shown in FIG. 7 is in that the dead zone is provided. In FIG. 11, when an absolute value of a corresponding load current is less than a threshold value (dead zone), each control unit performs the dead-time addition control without executing the dead-time compensation control regardless of the direction of the change in the logical value of the corresponding command signal and a polarity of the load current. Other points of FIG. 11 are the same as those of the case of FIG. 7. Therefore, description will not be repeated.

Figure 12:
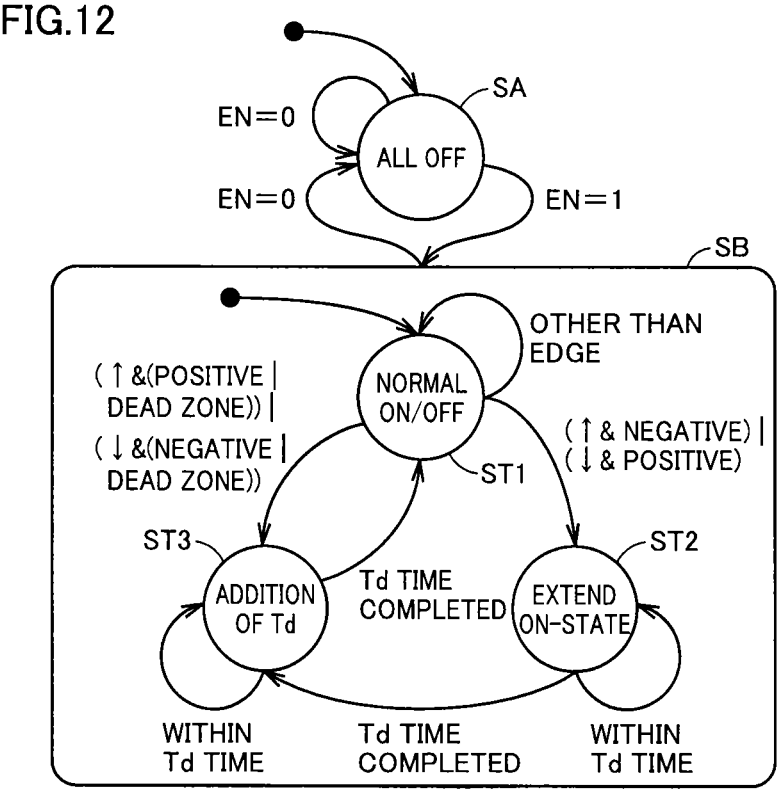
FIG. 12 is a state transition diagram representing an operation of each control unit in the power module in accordance with the third embodiment.

FIG. 12 is a state transition diagram representing operations of each control unit in the power module in accordance with the third embodiment. The state transition diagram of FIG. 12 is different from the state transition diagram of FIG. 8 in the condition for shifting from internal state ST1 to internal state ST2 or ST3.

In FIG. 12, when the following first condition or second condition is satisfied, each control unit shifts from internal state ST1 to internal state ST2, and when neither the first condition nor second condition is satisfied, each control unit shifts from internal state ST1 to internal state ST3. The first condition is the case where the high-potential side switching element is in the on-state (the falling edge (↓) of the corresponding command signal) and the corresponding load current is positive and greater than or equal to a predetermined threshold value in the last normal control. The second condition is the case where the low-potential side switching element is in the on-state (the rising edge (↑) of the corresponding command signal) and the corresponding load current is negative and greater than or equal to the threshold value in the last normal control. Other points in FIG. 12 are the same as those of the case of FIG. 8. Therefore, description will not be repeated.

Figure 13:
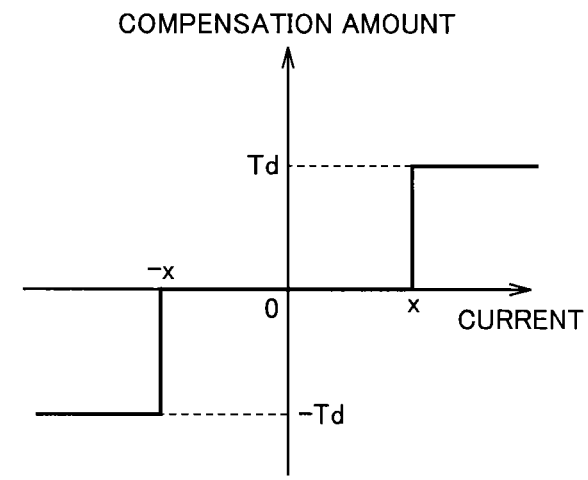
FIG. 13 represents a relationship between a load current and a dead-time compensation amount in the power module in accordance with the third embodiment.

FIG. 13 represents a relationship between a load current and a dead-time compensation amount in the power module according to the third embodiment. Referring to FIG. 13, in the power module of the third embodiment, when the absolute value of the load current is less than a threshold value x, the dead-time compensation amount becomes 0 (the dead-time compensation control is not performed). Accordingly, the distortion in the output voltage of the power conversion unit can be further reduced.

Fourth Embodiment

In the power module of a fourth embodiment, to solve the problem which is similar to the case of the third embodiment, the period of executing the dead-time compensation control (the aforementioned maintaining time or extension time) is set to be variable. In the following, it will be specifically described with reference to FIGS. 14 to 16.

FIG. 14 is a diagram representing, in a table format, an output operation of of each control unit in accordance with a corresponding command signal and a direction of a load current in the power module of the fourth embodiment. The point different from the table shown in FIG. 7 is in that the dead zone is provided.

Specifically, in FIG. 14, in the case where the rising edge (↑) of the corresponding command signal is provided, and the corresponding load current is negative and has an absolute value which is less than a threshold value (dead zone), the maintaining time (extension time) for maintaining the state of the last normal control in the dead-time compensation control is shortened. The maintaining time is set to be proportional to an absolute value of the corresponding load current. When the rising edge (↑) of the corresponding command signal is provided, and the corresponding load current is negative and has an absolute value greater than or equal to the threshold value, the maintaining time in the dead-time compensation control is set to be equal to the period of dead time Td.

Further, in FIG. 14, in the case where the falling edge (↓) of the corresponding command signal is provided, and the corresponding load current is positive and has an absolute value which is less than a threshold value (dead zone), the maintaining time (extension time) for maintaining the state of the last normal control is shortened in the dead-time compensation control. The maintaining time is set to be proportional to an absolute value of the corresponding load current. When the falling edge (↓) of the corresponding command signal is provided, and the corresponding load current is positive and has an absolute value greater than or equal to a threshold value, the maintaining time in the dead-time compensation control is set to be equal to the period of dead time Td. Other points in FIG. 11 are the same as those of the case shown in FIG. 7. Therefore, description will not be repeated.

FIG. 15 is a state transition diagram representing operations of each control unit in the power module in accordance with the fourth embodiment. It is different from the state transition diagram of FIG. 8 in the conditions for shifting from internal state ST2 to internal state ST3. In FIG. 15, in the case where the absolute value of the corresponding load current is greater than or equal to the threshold value, the internal state is shifted from internal state ST2 to internal state ST3 when the maintaining time (extension time) Te set to be equal to dead time Td has elapsed. In the case where the absolute value of the corresponding load current is less than the threshold value, the internal state is shifted from internal state ST2 to internal state ST3 when the maintaining time Te set to be less than dead time Td has elapsed. Maintaining time Te is set to be proportional to an absolute value of the corresponding load current. Other points in FIG. 15 are the same as the case of FIG. 8. Therefore, description will not be repeated.

Figure 16:
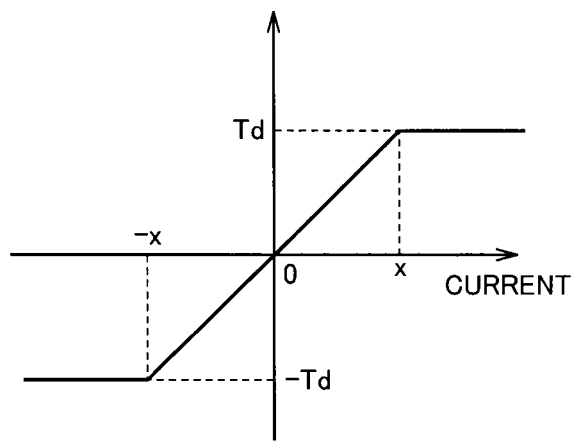
FIG. 16 represents a relationship between a load current and a dead-time compensation amount in the power module in accordance with the fourth embodiment.

FIG. 16 represents a relationship between a load current and a dead-time compensation amount in the power module in accordance with the fourth embodiment. Referring to FIG. 16, in the power module of the fourth embodiment, when the absolute value of the load current is less than threshold value x, the dead-time compensation amount is changed in proportion to the load current. Consequently, the distortion in the output voltage of the power conversion unit can be further reduced.

Fifth Embodiment

[Configuration of Logic Circuit Unit]

Figure 17:
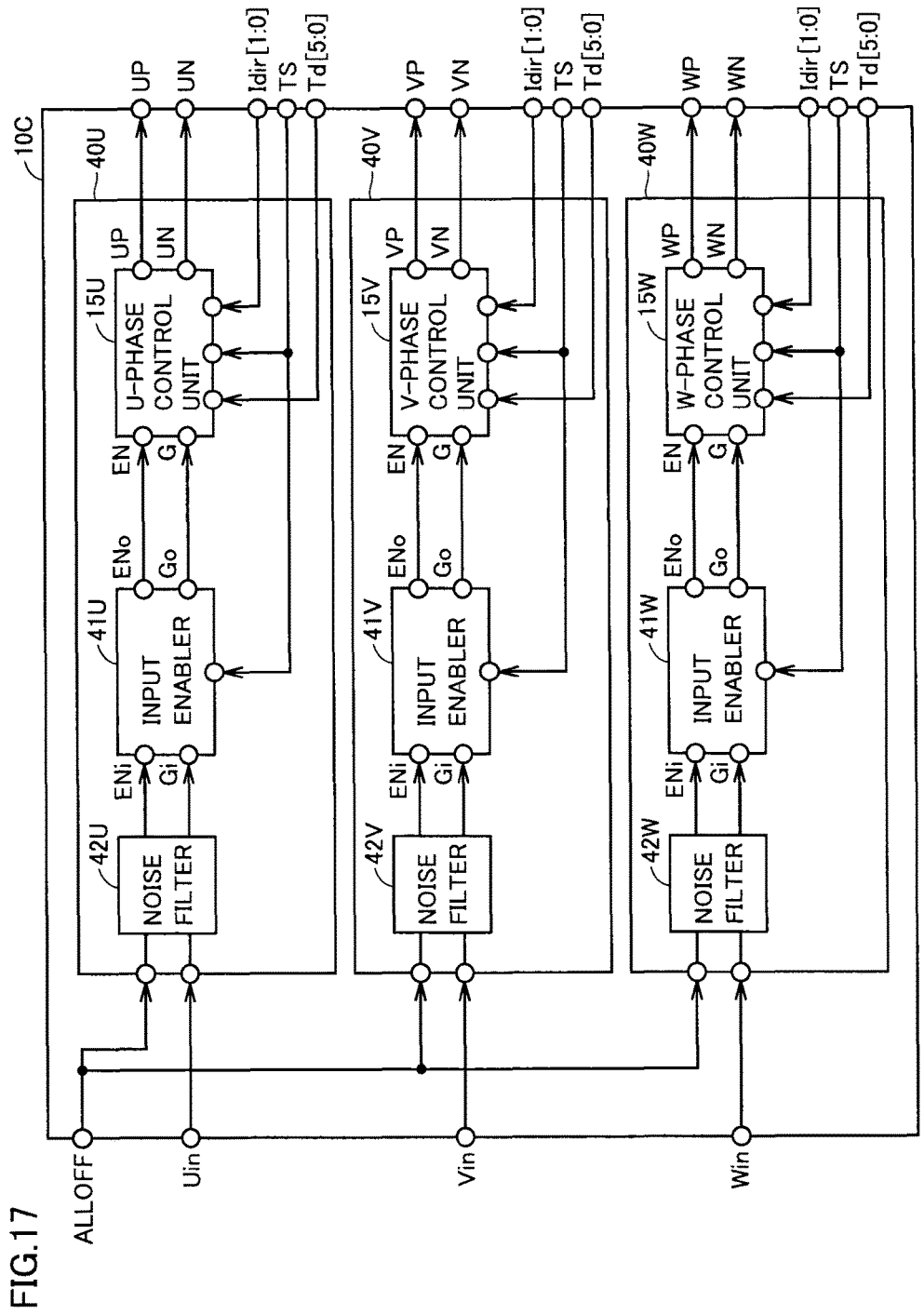
FIG. 17 is a block diagram representing a configuration of a logic circuit unit in a power module in accordance with a fifth embodiment.

FIG. 17 is a block diagram representing a configuration of a logic circuit unit in a power module in accordance with a fifth embodiment.

Referring to FIG. 17, a logic circuit unit 10C includes N (N=3) control units 15U, 15V, 15W corresponding respectively to N (N=3) switching-element pairs 31, 32, 33 of FIG. 2, and N (N=3) input enablers (also referred to as "delay devices") 41U, 41V, 41W corresponding respectively to switching-element pairs 31, 32, 33.

Each input enabler (41U, 41V, 41W) receives a corresponding command signal (Uin, Vin, Win: collectively referred to as Gi) and an all-off signal ALLOFF (enable signal ENi), and delays a timing at which all-off signal ALLOFF is negated (enable signal ENi is asserted) until the timing at which the logical value of corresponding command signal Gi is switched. It should be noted that noise filters 42U, 42V, 42W may be provided in the fore stage of input enablers 41U, 41V, 41W, respectively.

Each control unit (15U, 15V, 15W) may have any of the configurations described in the first to fourth embodiments, and generates a high-potential side control signal and a low-potential side control signal to be outputted to a corresponding switching-element pair in accordance with a corresponding command signal G, an enable signal EN delayed by a corresponding input enabler (41U, 41V, 41W), and a polarity Idir [1:0] of a corresponding load current.

As shown in FIG. 17, a direction Idir [1:0] of a corresponding load current, a timing signal TS for use as a clock, and a set value Td [5:0] of a dead time are further inputted to each control unit (15U, 15V, 15W). Timing signal TS is inputted also to each input enabler (41U, 41V, 41W). For each of U-phase, V-phase, and W-phase, a logic circuit unit (40U, 40V, 40W) is constituted of a noise filter, an input enabler, and a control unit.

[Operation of Logic Circuit Unit]

In the following paragraphs, an operation of logic circuit unit 10C of FIG. 17 will be described. Since the operation of the logic circuit unit for each phase (40U, 40V, 40W) is similar, description is made without particularly specifying the phase in the following paragraphs.

Figure 18:
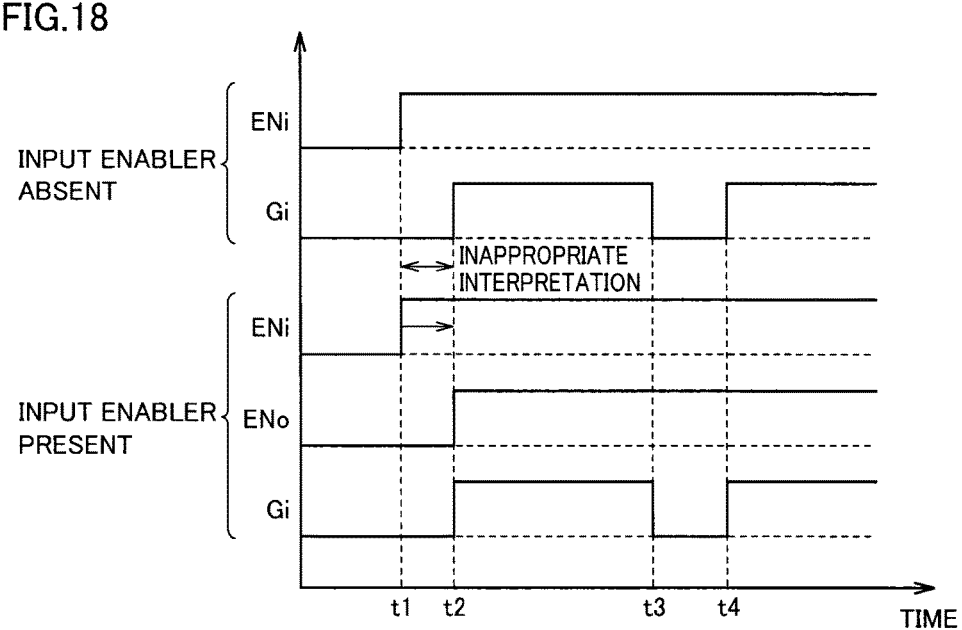
FIG. 18 is a timing chart representing an operation of an input enabler of FIG. 17 (the case where a rise of a command signal is later than a rise of an enable signal).

FIG. 18 is a timing chart representing an operation of the input enabler of FIG. 17 (the case where a rise in the command signal is later than a rise in the enable signal). In FIG. 18, the case where the input enabler is provided and the case where the input enabler is not provided are illustrated by comparison.

Referring to FIG. 18, input enable signal ENi is asserted at time t1, and a logical value of a corresponding input command signal Gi is switched at time t2 after time t1. In the case where the input enabler is not provided, a low-potential side control signal is asserted between time t1 and time t2. Therefore, an unintended and inappropriate control signal is supplied to a corresponding switching-element pair.

On the other hand, in the case where the input enabler is provided, the timing at which an output enable signal ENo is asserted is delayed until time t2 at which the logical value of the corresponding command signal is switched. Consequently, since an input is made with respect to the corresponding control unit in the state where the timing at which enable signal ENo is asserted and the timing at which the logical value of corresponding command signal Go are matched, the disadvantages described above do not occur. Further, the method can also be used, which comprises asserting in advance input enable signal ENi in the state where the logical values of command signals Uin, Vin, Win are "0" and thereafter switching command signals Uin, Vin, Win at any timing to a desired logical value.

Figure 19:
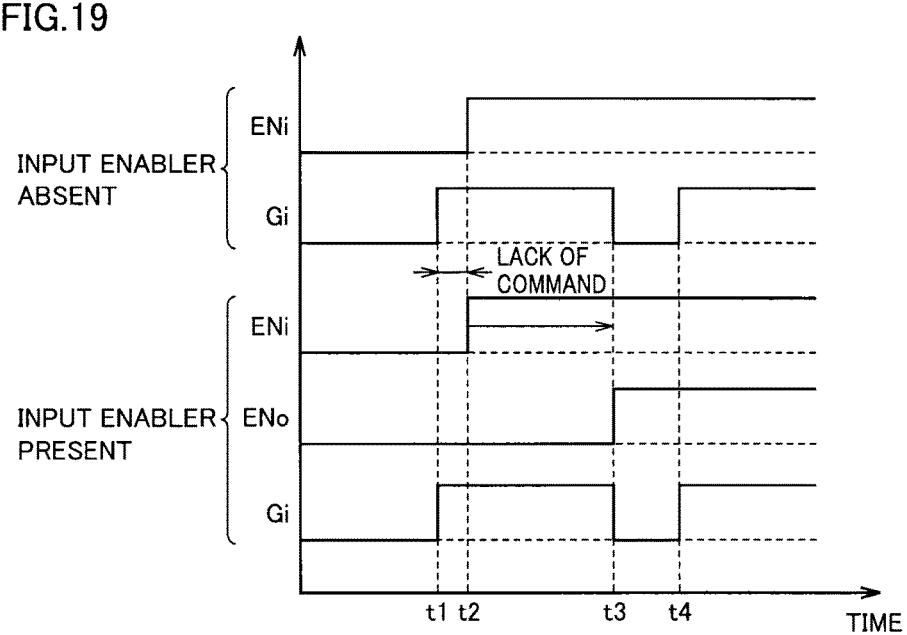
FIG. 19 is a timing chart representing an operation of an input enabler of FIG. 17 (the case where a rise of a command signal is earlier than a rise of an enable signal).

FIG. 19 is a timing chart representing an operation of the input enabler of FIG. 17 (the case where a rise in the corresponding command signal is earlier than a rise in the enable signal).

Referring to FIG. 19, the logical value of the corresponding command signal is switched at time t1, and enable signal ENi is asserted at time t2 which is later than time t1. When the input enabler is not provided, the on-time is reduced than the desired pulse width (lack of command) between time t1 and time t2. On the other hand, in the case where the input enabler is provided, since the timing at which output enable signal ENo is asserted is delayed until time t3 at which the logical value of the corresponding command signal is switched, the disadvantages described above do not occur.

Figure 20:
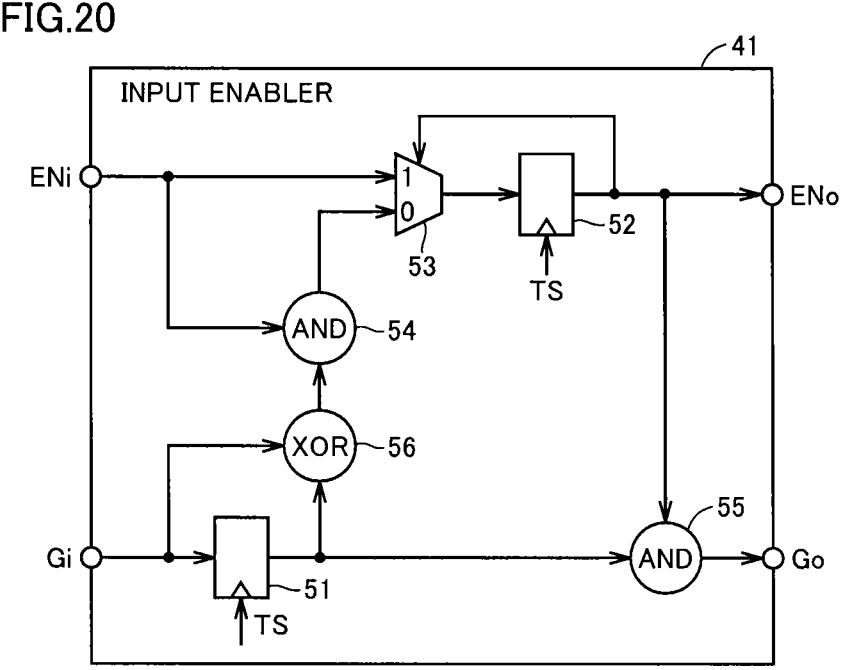
FIG. 20 is a circuit diagram representing one example of a configuration of the input enabler of FIG. 17.

FIG. 20 is a circuit diagram representing one example of the configuration of the input enabler of FIG. 17. Referring to FIG. 20, input enabler 41 includes D-latch circuits 51, 52, a selector 53, AND gates 54, 55, and an exclusive-OR gate (XOR gate) 56.

Enable signal ENi is inputted to selector 53 and AND gate 54. Corresponding command signal Gi is inputted to D-latch circuit 51 and XOR gate 56. XOR gate 56 outputs an exclusive OR between corresponding command signal Gi and an output of D-latch circuit 51 to AND gate 54. AND gate 54 outputs an AND operation result between enable signal ENi and an output of XOR gate 56 to selector 53. Selector 53 selects enable signal ENi in the case where an output of D-latch circuit 52 is "1," and selects an output of AND gate 54 in the case where an output of D-latch circuit 52 is "0." Selector 53 outputs a selection result to D-latch circuit 52. The output of D-latch circuit 52 is outputted as an enable signal ENo to a control unit in the rear stage, and outputted to AND gate 55. AND gate 55 outputs an AND operation result between the output of latch circuit 51 and the output of latch circuit 52 as a command signal Go to the control unit in the rear stage.

According to input enabler 41 having the configuration described above, outputted enable signal ENo and command signal Go are "0" while input enable signal ENi is "0." When input enable signal ENi becomes "1," and input command signal Gi becomes "1," an internal state of D-latch circuit 52 becomes "1," and consequently output enable signal ENo becomes "1." Accordingly, input command signal Gi is outputted as command signal Go to the control unit in the latter stage.

Sixth Embodiment

A power module 2 of the sixth embodiment can directly receive control signals UP, UN, VP, VN, WP, WN for respectively controlling on and off of 2×N (N=3) switching elements 31P, 31N, 32P, 32N, 33P, 32N constituting power conversion unit 30 of FIG. 2 from outside of power module 2. Accordingly, as for an input interface, power module 2 is applicable to the case of conventional 2×N input (legacy correspondence) and the case of N+1 input having the reduced number of input signals. In the following description, the mode of directly inputting control signals UP, UN, VP, VN, WP, WN of the switching elements from outside is referred to as the first operation mode, and the mode of inputting command signals Uin, Vin, Win and enable signal EN described in the first to fifth embodiments is referred to as the second operation mode.

Figure 21:
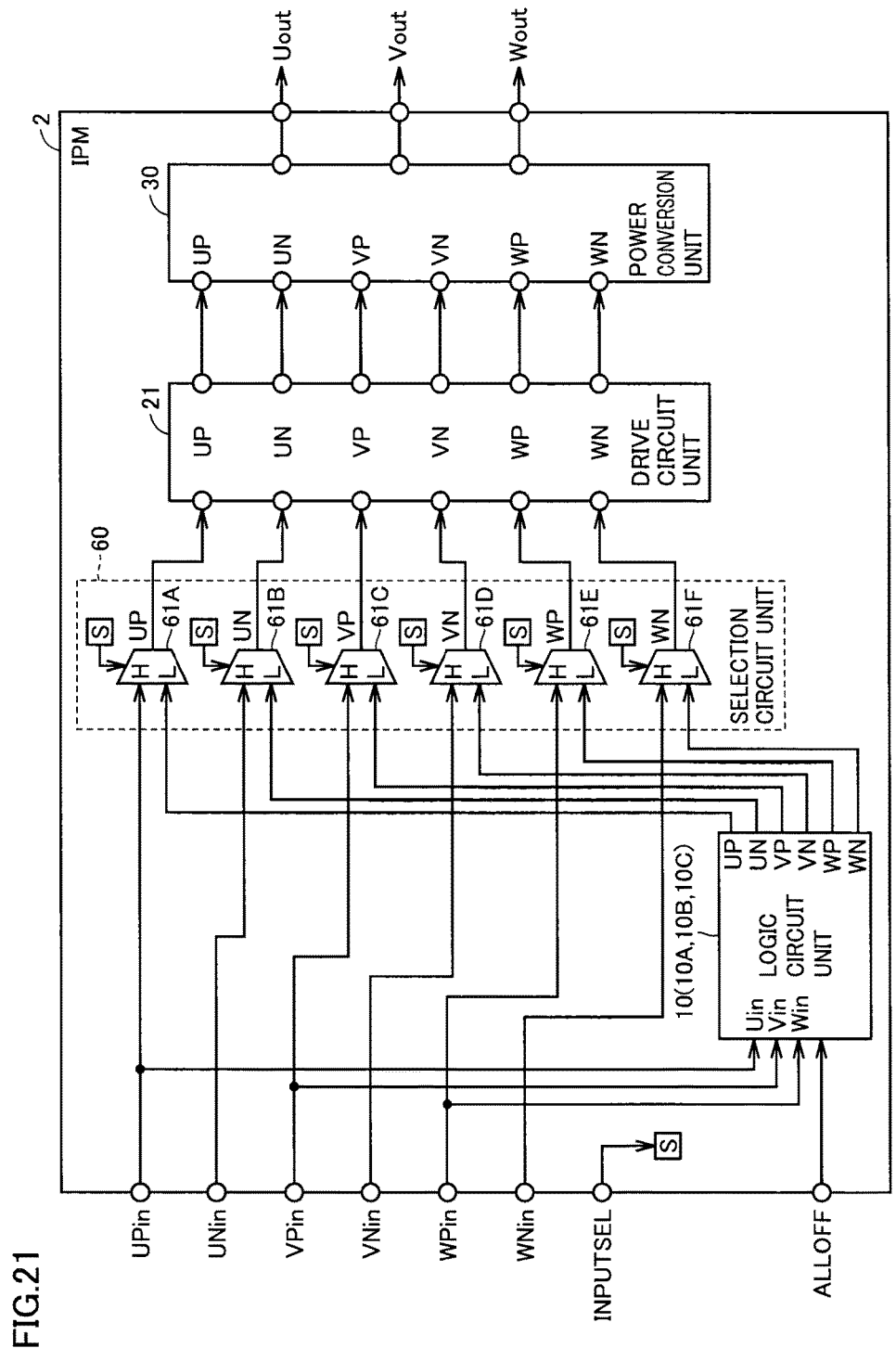
FIG. 21 is a block diagram representing a configuration of a power module in accordance with a sixth embodiment.

FIG. 21 is a block diagram representing a configuration of the power module in accordance with the sixth embodiment. Referring to FIG. 21, power module 2 includes a logic circuit unit 10, a drive circuit unit 21, a power conversion unit 30, and a selection circuit unit 60. Further, power module 2 includes 2×N (N=3) control signal terminals (also referred to as a UPin terminal, a UNin terminal, a VPin terminal, a VNin terminal, a WPin terminal, and a WNin terminal) to which control signals UP, UN, VP, VN, WP, WN are respectively inputted during the first operation mode, a terminal (EN terminal) for receiving all-off signal ALLOFF, and a mode signal terminal for receiving a mode signal INPUTSEL for setting the operation mode.

The configuration of logic circuit unit 10 may be any configuration of logic circuit units 10A, 10B, 10C described in FIGS. 3, 6, 17 and the like. The configuration of drive circuit unit 21 is similar to that described in FIG. 1, and the configuration of power conversion unit 30 is similar to that described in FIG. 2. Although it is not illustrated in FIG. 21, insulating circuit unit 20 and current detection unit 22 may be provided in power module 2 as shown in FIG. 1.

Selection circuit unit 60 selects either control signals which are directly inputted from the UPin terminal, the UNin terminal, the VPin terminal, the VNin terminal, the WPin terminal, and the WNin terminal or control signals outputted from logic circuit unit 10, depending on a logic level (H or L) of mode signal INPUTSEL. Selected control signals UP, UN, VP, VN, WP, WN are inputted to power conversion unit 30 through drive circuit unit 21.

In the case of FIG. 21, in the second operation mode, command signals Uin, Vin, Win are inputted respectively from the UPin terminal, VPin terminal, and WPin terminal. More generally, any N terminals among 2×N (N=3) control signal terminals may be selected as terminals to which N command signals Uin, Vin, Win are inputted.

Seventh Embodiment

Figure 22:
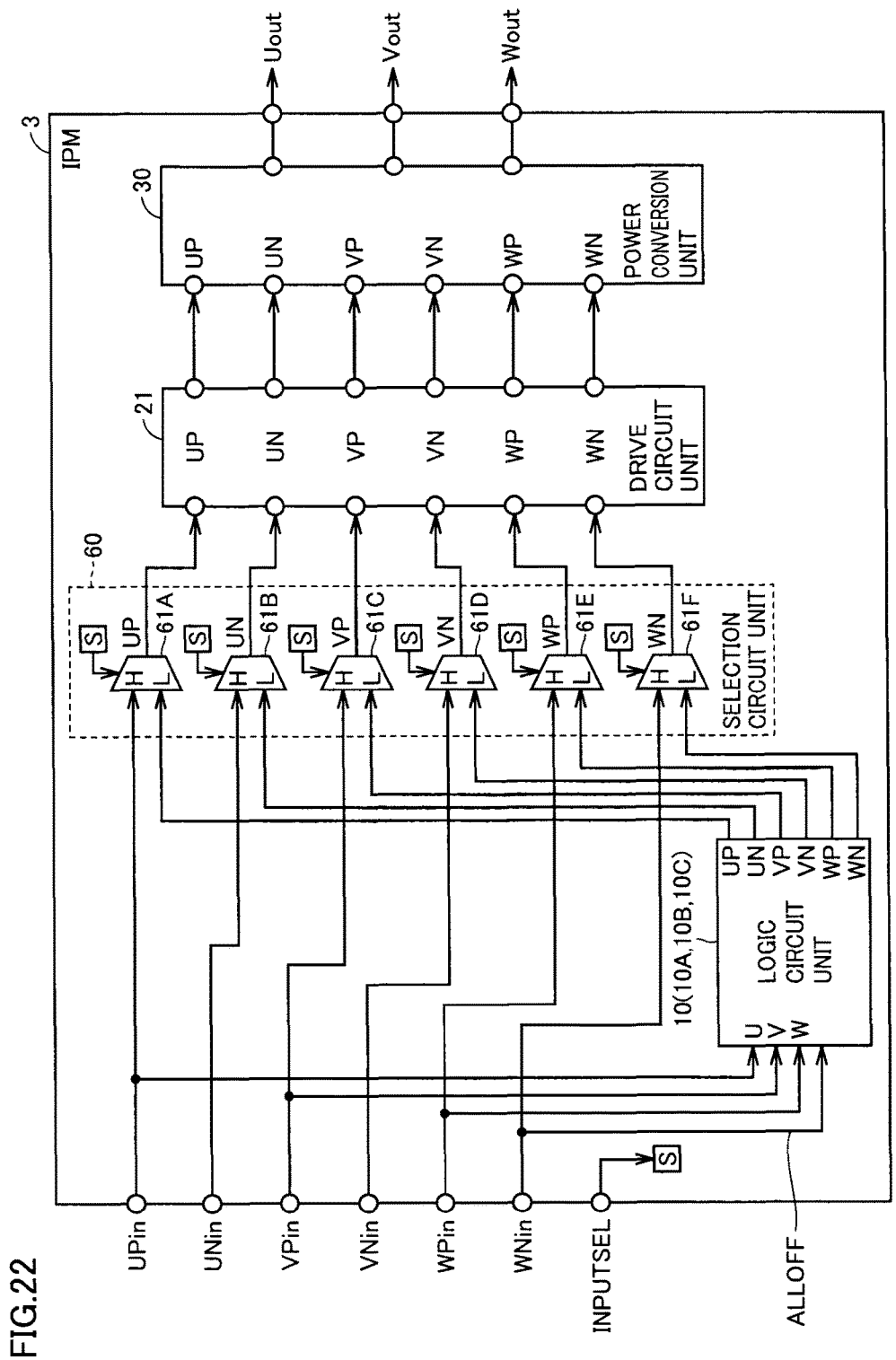
FIG. 22 is a block diagram representing a configuration of a power module in accordance with a seventh embodiment.

FIG. 22 is a block diagram representing a configuration of a power module in accordance with the seventh embodiment. Power module 3 of FIG. 22 is different from power module 2 of FIG. 21 in that an EN terminal to which all-off signal ALLOFF is inputted is not provided. In the case of FIG. 22, all-off signal ALLOFF is inputted from the WNin terminal. More generally, any N+1 terminals among 2×N (N=3) control signal terminals may be set as terminals to which N command signals Uin, Vin, Win and all-off signal ALLOFF are inputted.

Since other points of FIG. 22 are the same as those of FIG. 21, the same or corresponding parts have the same reference numerals allotted, and description thereof will not be repeated.

Eighth Embodiment

Figure 23:
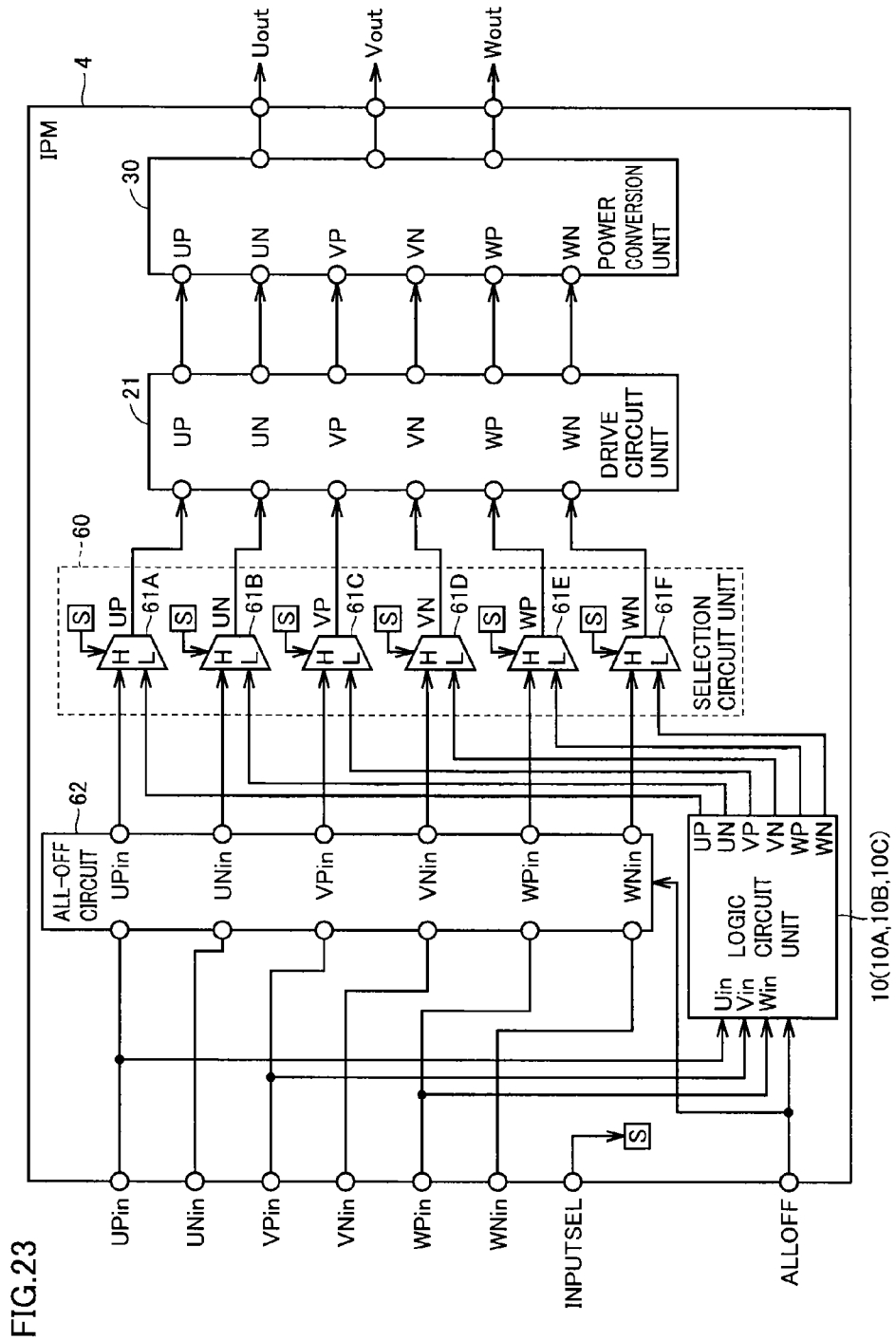
FIG. 23 is a block diagram representing a configuration of a power module in accordance with an eighth embodiment.

FIG. 23 is a block diagram representing a configuration of a power module in accordance with the eighth embodiment. Power module 4 of FIG. 23 is different from power module 2 of FIG. 21 in further including an all-off circuit 62.

All-off circuit 62 receives an all-off signal ALLOFF (enable signal EN) inputted from outside. When enable signal EN is negated during the first operation mode, all-off circuit 62 negates all of control signals UP, UN, VP, VN, WP, WN directly inputted from 2×N (N=3) control signal terminals to turn off all of the switching elements constituting power conversion unit 30.

FIG. 24 is a diagram for illustrating one example of a use method of the power module of FIG. 23. In FIG. 24(A), for comparison, one example of conventional power module 67 is shown to which all of control signals UP, UN, VP, VN, WP, WN for the three-phase power conversion unit are inputted from outside. In FIG. 24(B), an example is shown which is the case where power module 4 of the eighth embodiment is used in the first operation mode.

Referring to FIG. 24(A), control signals UP, UN, VP, VN, WP, WN outputted from a user controller 65 are inputted respectively to control signal terminals provided in power module 67 through a cutoff circuit 66. Power module 67 is provided with an error signal output terminal 63, and an outputted error signal is inputted to cutoff circuit 66 through OR gate 64 with other control signals such as an abnormal stop signal. Cutoff circuit 66 negates all of control signals UP, UN, VP, VN, WP, WN inputted to power module 67 when an output of OR gate 64 is asserted.

Referring to FIG. 24(B), in the case of power module 4 of the eighth embodiment, an output of OR gate 64 can be inputted to an input terminal (EN terminal) of all-off signal ALLOFF provided in power module 4. When an output of OR gate 64 is asserted, all-off circuit 62 of FIG. 23 provided inside of power module 4 negates all of control signals UP, UN, VP, VN, WP, WN. Therefore, there is no need to provide cutoff circuit 66 outside of the power module, so that the system configuration can be simplified.

Modified Example

In each embodiment described above, the three-phase inverter is described as an example. However, the technique described above can be applied also to the case of a single phase inverter (N=2) and the case of a converter which converts alternating current to direct current.

It should be understood that the embodiments disclosed herein are only by way of examples, and not to be taken by way of limitation. Therefore, the technical scope of the present invention is not limited by the description above, but rather by the terms of the appended claims. Further, any modifications within the scope and meaning equivalent to the terms of the claims are included.

REFERENCE SIGNS LIST

1, 2, 3, 4 power module; 10 logic circuit unit; 11 signal distribution circuit unit; 12 all-off circuit unit; 13 dead-time compensation circuit unit; 14 dead-time addition circuit unit; 15U, 15V, 15W control unit; 20 insulating circuit unit; 21 drive circuit unit; 22 current detection unit; 30 power conversion unit; 31, 32, 33 switching-element pair; 31P, 31N, 32P, 32N, 33P, 33N switching element; 34P, 34N, 35P, 35N, 36P, 36N diode; 41, 41U, 41V, 41W input enabler; 60 selection circuit unit; 62 all-off circuit; HV, LV power supply terminal; IU, IV, IW load current; SA, ST1, ST2, ST3 internal state; UP, UN, VP, VN, WP, WN control signal; Uin, Vin, Win command signal; ALLOFF all-off signal; EN enable signal; INPUTSEL mode signal.

The invention claimed is:

1. A power module comprising:
    a power conversion circuit including:
        N switching-element pairs each constituted of first and second switching elements connected in series; and
        a plurality of diodes each connected in inverse-parallel with each of said first and second switching elements; and
    a control circuit which receives:
        N command signals corresponding respectively to said N switching-element pairs; and
        a shared enable signal,
    said control circuit being configured to:
        when said shared enable signal is negated, execute all-off control of turning off all of said first and second switching elements;
        when said shared enable signal is asserted, execute normal control, dead-time addition control, and dead-time compensation control for each of said N switching-element pairs per period of a corresponding command signal;
        under said dead-time addition control, turn off said first and second switching elements during a predetermined dead time;
        after said dead-time addition control, execute said normal control of turning on one of said first and second switching elements and turning off another one of said first and second switching elements in accordance with a logical value of the corresponding command signal;
        when the logical value of the corresponding command signal is switched, shift from executing said normal control to executing said dead-time compensation control of maintaining a previous state of said first and second switching elements for an additional period of time, depending on a direction of a change in the logical value and a polarity of a load current outputted from a connection node of said first and second switching elements; and
        after said dead-time compensation control, execute said dead-time addition control.

2. The power module according to claim 1, wherein
    said control circuit includes N control subcircuits corresponding respectively to said N switching-element pairs,
    each of said N control subcircuits has first to fourth states as internal states, shifts between each of said internal states, in accordance with the corresponding command signal, said shared enable signal, and the polarity of said load current outputted from a corresponding switching-element pair, and controls on and off of corresponding first and second switching elements in accordance with said internal states, and
    each of said N control subcircuits executes said normal control, said dead-time compensation control, said dead-time addition control, and said all-off control respectively in said first to fourth states.

3. The power module according to claim 1, wherein
    said control circuit includes:
        a signal distribution circuit which generates N first control signals synchronized respectively with said N command signals, and N second control signals having inversed phases of said N command signals;
        a dead-time compensation circuit which performs said dead-time compensation control by delaying switching of a logical value of each of said first and second control signals at a timing of one of a rise and a fall of the corresponding command signal, based on the direction of the change at a time of switching of the logical value of the corresponding command signal and the polarity of said load current;
        a dead-time addition circuit which performs said dead-time addition control by delaying a timing of switching each of said N first and second control signals from negation to assertion during said predetermined dead time; and
        an all-off circuit which performs said all-off control by negating all of said N first and second control signals when said shared enable signal is negated, and
    after passing through said all-off circuit, said dead-time compensation circuit, and said dead-time addition circuit, each of said N first control signals is supplied to a corresponding first switching element, and each of said N second control signals is supplied to a corresponding second switching element.

4. The power module according to claim 1, wherein said control circuit is configured to:
    shift from said normal control to said dead-time compensation control in a case where the logical value of the corresponding command signal is switched and a first condition or a second condition is satisfied; and
    shift from said normal control to said dead-time addition control in a case where the logical value of the corresponding command signal is switched and neither of said first nor second conditions is satisfied, said first condition is a case where a high-potential side switching element among said first and second switching elements is in an on-state and said load current is positive in the previous state, and said second condition is a case where a low-potential side switching element is in an on-state and said load current is negative in the previous state.

5. The power module according to claim 4, wherein the additional period of time for maintaining the previous state of said first and second switching elements in said dead-time compensation control is equal to said predetermined dead time.

6. The power module according to claim 4, wherein
in a case where an absolute value of a corresponding load current is greater than or equal to a predetermined threshold value, the additional period of time for maintaining the previous state of said first and second switching elements in said dead-time compensation control is equal to said predetermined dead time, and in a case where an absolute value of said corresponding load current is less than said predetermined threshold value, the additional period of time is shorter than said predetermined dead time and changes in proportion to the absolute value of said corresponding load current.

7. The power module according to claim 1, wherein said control circuit is configured to:
shift from said normal control to said dead-time compensation control in a case where the logical value of the corresponding command signal is switched and a first condition or a second condition is satisfied; and shift from said normal control to said dead-time addition control in a case where the logical value of the corresponding command signal is switched and neither said first condition nor second condition is satisfied, said first condition is a case where a high-potential side switching element among said first and second switching elements is in an on-state and said load current is positive and greater than or equal to a predetermined threshold value in said previous state, said second condition is a case where a low-potential side switching element is in an on-state and said load current is negative and greater than or equal to said predetermined threshold value in said previous state, and the additional period of time for maintaining the previous state of said first and second switching elements in said dead-time compensation control is equal to said predetermined dead time.

8. The power module according to claim 1, wherein said control circuit includes:
N control subcircuits corresponding respectively to said N switching-element pairs; and N delay devices corresponding respectively to said N switching-element pairs, each of said N delay devices receives the corresponding command signal and said shared enable signal, and delays a timing of asserting said shared enable signal until a timing of switching the logical value of the corresponding command signal, and each of said N control subcircuits controls on and off of said first and second switching elements in accordance with the corresponding command signal, said shared enable signal delayed by a corresponding delay device, and a corresponding polarity of a corresponding load current.

9. The power module according to claim 1, wherein
said first and second switching elements constituting each of said N switching-element pairs are switched on and off in accordance with respective first and second control signals for each of said N switching-element pairs, said power module has, as operation modes:
a first operation mode of directly receiving, from outside, N first control signals and N second control signals inputted to said power conversion circuit; and a second operation mode of receiving, from outside, said N command signals and said shared enable signal and generating said N first control signals and said N second control signals by said control circuit, said power module further comprises:
2×N control signal terminals which receive, from outside, said N first control signals and said N second control signals at a time of said first operation mode;

an enable signal terminal which receives said shared enable signal;

a mode signal terminal which receives a mode signal for setting said first operation mode and said second operation mode; and a selection circuit which selects either signals inputted from said 2×N control signal terminals or 2×N signals generated by said control circuit, depending on said mode signal, and outputs the selected signals to said power conversion circuit, and during said second operation mode, said N command signals are inputted to said control circuit through predetermined N terminals among said 2×N control signal terminals.

10. The power module according to claim 9, further comprising:
an all-off circuit which turns off all of said first and second switching elements constituting said power conversion circuit by negating all of signals inputted from said 2×N control signal terminals when said shared enable signal is negated during said first operation mode.

11. The power module according to claim 1, wherein
said first and second switching elements constituting each of said N switching-element pairs are switched on or off in accordance with respective first and second control signals for each of said N switching-element pairs, said power module has, as operation modes:
a first operation mode of directly receiving, from outside, N first control signals and N second control signals inputted to said power conversion circuit; and a second operation mode of receiving, from outside, said N command signals and said shared enable signal and generating said N first control signals and said N second control signals by said control circuit, said power module further comprises:
2×N control signal terminals which receive, from outside, said N first control signals and said N second control signals during said first operation mode;

a mode signal terminal which receives a mode signal for setting said first operation mode and said second operation mode; and a selection circuit which selects either signals inputted from said 2×N control signal terminals or 2×N signals generated by said control circuit, depending on said mode signal, and outputs the selected signals to said power conversion circuit, and during said second operation mode, said N command signals and said shared enable signal are inputted to said control circuit through predetermined N+1 terminals among said 2×N control signal terminals.

12. The power module according to claim 1, wherein
said first and second switching elements constituting each of said N switching-element pairs is switched on and off in accordance with respective first and second control signals for each of said N switching-element pairs,
said power module further comprises N+1 signal input terminals for receiving from outside said N command signals and said shared enable signal, and
said control circuit generates N first control signals and N second control signals based on said N command signals and said shared enable signal.

13. The power module according to claim 1, further comprising:
N or N−1 current detectors which individually detect load currents outputted from said N switching-element pairs or detect load currents outputted from N−1 switching-element pairs excluding an optional one to obtain information including a polarity of each of said load current.

14. The power module according to claim 3, wherein said dead-time addition circuit receives a set value of the predetermined dead time.

15. The power module according to claim 3, further comprising:
a drive circuit configured to amplify said N first control signals and said N second control signals before supplying said N first control signals and said N second control signals to said N switching-element pairs.

* * * * *